United States Patent
Wang et al.

(10) Patent No.: US 12,058,263 B2
(45) Date of Patent: *Aug. 6, 2024

(54) TOKEN OFFLINE PROVISIONING

(71) Applicant: Visa International Service Association, San Francisco, CA (US)

(72) Inventors: Quan Wang, Foster City, CA (US); Yuexi Chen, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/151,066

(22) Filed: Jan. 6, 2023

(65) Prior Publication Data
US 2023/0146453 A1    May 11, 2023

Related U.S. Application Data

(63) Continuation of application No. 16/964,019, filed as application No. PCT/US2018/015299 on Jan. 25, 2018, now Pat. No. 11,569,998.

(51) Int. Cl.
*H04L 9/32*    (2006.01)
*H04L 9/08*    (2006.01)

(52) U.S. Cl.
CPC .......... *H04L 9/3213* (2013.01); *H04L 9/0891* (2013.01); *H04L 9/0894* (2013.01); *H04L 2209/80* (2013.01)

(58) Field of Classification Search
CPC .... H04L 9/3213; H04L 9/0891; H04L 9/0894
USPC ........................................................ 713/168
See application file for complete search history.

(56) References Cited

U.S. PATENT DOCUMENTS

| | | | |
|---|---|---|---|
| 10,700,875 B1* | 6/2020 | Daruwalla | ........... G06Q 20/108 |
| 2014/0149746 A1 | 5/2014 | Yau | |
| 2014/0208112 A1* | 7/2014 | McDonald | .............. G06F 21/34 |
| | | | 713/171 |
| 2016/0337351 A1* | 11/2016 | Spencer | .............. H04L 63/0876 |

(Continued)

FOREIGN PATENT DOCUMENTS

JP    2015061261 A    3/2015

OTHER PUBLICATIONS

Application No. PCT/US2018/015299, International Search Report and Written Opinion, Mailed On Oct. 8, 2018.

*Primary Examiner* — Dant B Shaifer Harriman
*Assistant Examiner* — Phuc Pham
(74) *Attorney, Agent, or Firm* — Kilpatrick Townsend & Stockton LLP

(57) ABSTRACT

A system and method are provided for generating access tokens on a user device rather than via a remote server computer. An access token can be generated on a second user device by combining and encrypting, with format preservation, a primary access identifier, variable value, and salt. The resulting value can be provided to a first user device that subsequently can provide the access token to an access device as a part of an interaction. The access device can generate an authorization request message that includes the access token and transmit the authorization request message to a remote server computer for processing. The remote server computer can process the access token to determine the primary access identifier despite not being involved in the generation of the access token, providing an improvement over conventional tokenization methods.

19 Claims, 10 Drawing Sheets

(56) References Cited

U.S. PATENT DOCUMENTS

2016/0344709 A1\* 11/2016 Sadhasivan .............. G09C 1/00
2017/0195316 A1\* 7/2017 Murdoch .............. H04L 63/067

\* cited by examiner

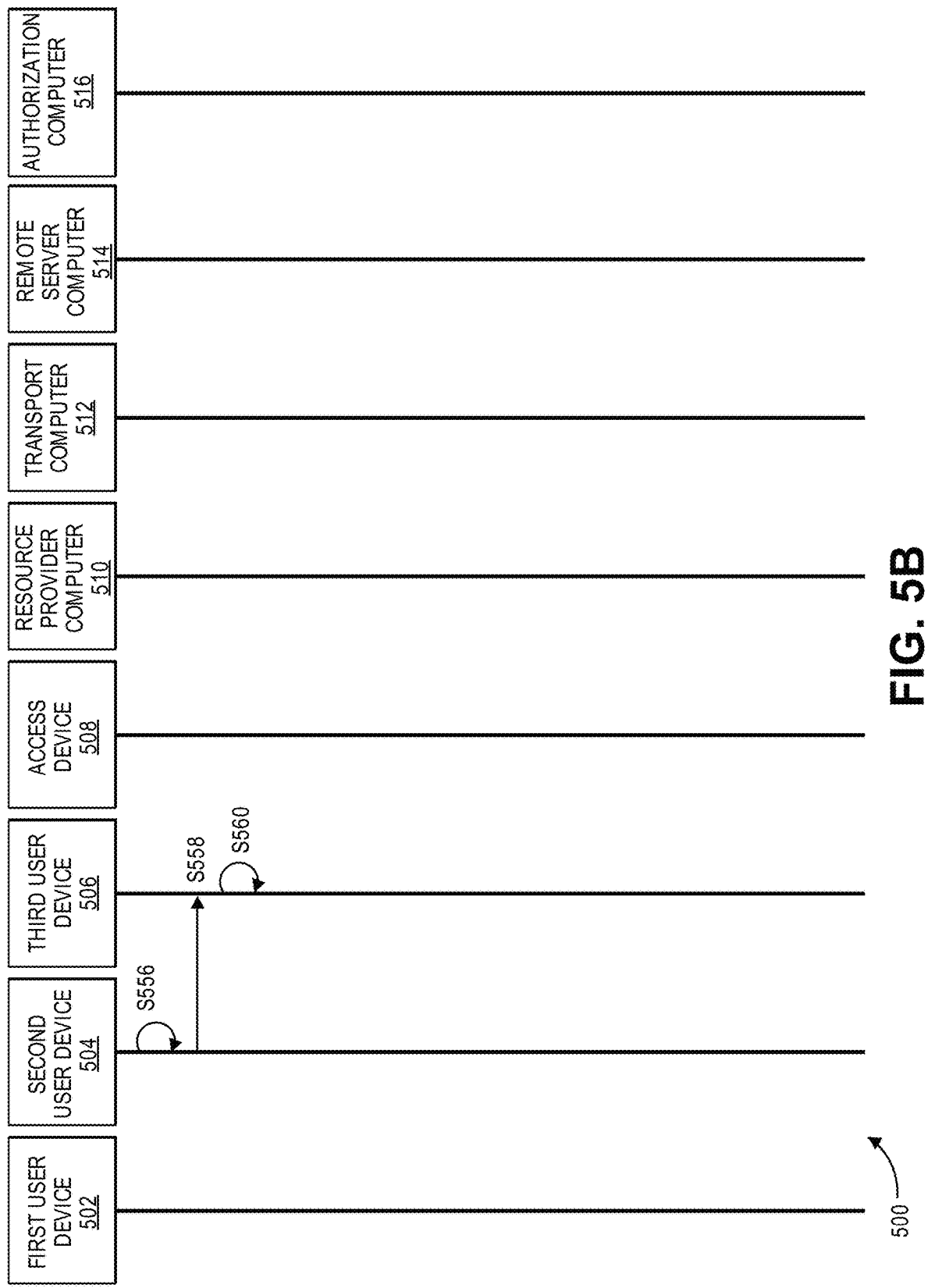

TOKEN OFFLINE PROVISIONING

CROSS-REFERENCE TO RELATED APPLICATIONS

This is a continuation of U.S. application Ser. No. 16/964,019, filed Jul. 22, 2020, which is a 371 National Stage of International Patent Application No. PCT/US2018/015299, filed Jan. 25, 2018, the disclosures of which are incorporated by reference herein in their entireties.

BACKGROUND

In conventional access or authorization systems, a user may provide a credential either directly or via a user device to an access device. The access device may generate an authorization request message including the credential and transmit it to an authorization computer for processing. The authorization computer may process the authorization request message and produce an authorization response message that is transmitted back to the access device. The authorization response message indicates to the access device whether the user is authorized to access something, such as a resource. As an example, a user may be attempting to access a building, and may provide a credential such as a password. An authorization computer may determine if the password matches a stored password, and may authorize access to the building (e.g., by unlocking the door) if the passwords match.

This conventional method presents a problem, as malicious users are presented a number of opportunities to compromise sensitive credential information. A malicious user may electronically eavesdrop on communications between the access device and the authorization computer and gain access to the authorization request message. From the authorization request message, the malicious user may determine the credential used, and from that point on, may impersonate the user by using that credential.

Directly encrypting the credential is one solution to this problem. However, this presents a problem in many conventional authorization systems that require some specific credential format. Typically, some aspects of the credential are used for the purpose of routing the authorization request message to its intended recipient. For example, a property company may own several access controlled apartment complexes throughout the United States. A user attempting to access their apartment in San Francisco may have their authorization request message serviced by a different authorization computer than a different user attempting to access their apartment in New York City. Some digits of the user's respective access codes may be used to route the authorization request messages to their correct destination. For example, San Francisco apartments may have access codes beginning with "3" and New York City apartments may have access codes beginning with "7."

When the access code is encrypted, there is a high probability that the leading digits of the access codes change, meaning an access terminal cannot determine the specific authorization computer that can process those access codes as part of an authorization request message. As a result, the conventional system may not be able to service authorization requests involving encrypted credentials.

Tokenization is one solution to prevent this problem. Instead of sending the credential as part of the authorization request message, the credential can be substituted for an "access token." This access token can be sent along with the authorization request message and be substituted with the credential or "de-tokenized" by a remote server computer that can then transmit the authorization request message and credential to the authorization computer for processing.

However, another problem arises in that the remote server computer needs to know the connection between the token and the credential, otherwise it will be unable to replace the access token with the credential. In many conventional token schemes, the remote server computer receives or has knowledge of the credential, generates a token, and then provides the token to a user or an associated user device. The user can then use the token in order to be authorized to access protected resources.

This can cause problems for users with a number of user devices. A user may want to use any of their devices to access a protected resource. For example, a user may want to access their apartment complex using their smart card, smart phone, or a wearable device such as a smart watch. The user may have to perform the tokenization process with the remote server computer with each of their devices. This process may involve a lengthy registration procedure. Additionally, the process may be difficult for devices without easy user interfaces, such as smart cards. Further, in conventional systems, tokenization can only occur if the user device can communicate with the remote server computer. If the user device is offline or has limited network connectivity, or if the remote server computer is temporarily out of service, the user device cannot be provisioned an access token and thus cannot be used in an access system.

Additionally, there are a number of interoperability concerns. An access terminal or remote server computer may have to interface with a number of different devices from a number of different manufacturers, each of which may use different communication protocols or methods. Additionally, each device manufacturer must create software that enables it to perform these tokenization functions with the remote server computer. This interoperability concern makes it considerably more difficult for manufacturers of user devices and access service providers.

Further, there is a serious risk of running out of access tokens. There are only a finite number of access tokens of finite length. With numerous users each possessing a number of user devices, it is possible that eventually there will be more users or user devices than access tokens, preventing new users from using the access system.

Embodiments of the invention address these and other concerns individually and collectively.

SUMMARY

Embodiments relate to methods and systems of offline token provisioning. Rather than generating a token as a substitute for a credential such as a primary access identifier (e.g., an account number or passcode) at a remote server computer and provisioning it to a first user device (such as a smart phone or wearable device), a second user device (such as a smart card) can generate an access token based off the primary access identifier and provision it to a first user device. The second user device can also generate a different access token for a third user device, and so on for any number of user devices. A user can operate the first user device and use the provisioned access token in an interaction. For example, a user may have a smart phone (first user device) that has an access token that enables them to enter their apartment complex that is protected by a keyless entry terminal (access device). The first user device interacts with the access device by transmitting the access token to the access device. The access device can forward the access token in an authorization request message to the remote server computer.

The remote server computer can process the authorization request message and determine the primary access identifier corresponding to the user that provided the access token. The remote server computer can then replace the access token with its primary access identifier and forward the authorization request message to an authorization computer. The authorization computer can analyze the authorization request message and produce an authorization response message. This authorization response message can be sent back to the access device, via the remote server computer. The access device can then allow the user access to the apartment complex.

These features solve a number of problems associated with conventional token-based access or authentication systems. As one example, because there is no need to communicate with a remote server computer as part of the token provisioning process, a user can be provisioned access tokens completely offline, without any communication with a remote server computer. Thus a user can be provisioned access tokens in remote regions with no internet connection or even if the remote server computer is malfunctioning or down for maintenance.

As another example, the user can generate access tokens for any number of devices without having to communicate with a remote server computer for each one. A user can simply interface a user device capable of access tokens with each of their other user devices in turn. A user does not need to go on their computer and perform a lengthy registration process for each of their devices.

Further, there is little concern over interoperability. Because the access tokens are generated without the remote server computer, the remote server computer does not need the capability to communicate or provision tokens to any of the user devices. This means that a wide variety of different user devices can be used by a user without any issue.

Also, because the access tokens are generated by the user device using an innovative diversification scheme, there is little risk of running out of access tokens. In a conventional system, a remote server computer can generate and issue a unique access token for each user device across all users of the system. This can involve producing two or three (or more) times as many access tokens as there are users of the system. Once there are no more unique access tokens, no more user devices can be provisioned with access tokens, meaning that new users cannot participate in the system. Embodiments allow for user devices to generate access tokens based off a primary access identifier, variable value and salt. By using a variable value and salt, a single primary access identifier can be used to generate unique access tokens for a number of user devices associated with a user. Each user can have a unique access token for each of their devices without the risk of running out of unique access tokens.

There are a number of advantages to using both a variable value and a salt, as opposed to using the variable value and the salt individually. For example, using a variable value guarantees access token uniqueness as to two or more devices operated by the same user and for access tokens derived from the same primary access identifier. The variable value helps to differentiate between access devices on different devices, and further adds an additional measure of uniqueness to the generated access tokens when used in combination with salts.

If an interaction is later contested or audited, the variable value can be used by the access server to identify the user device that performed that interaction. For example, a user may have had their phone stolen, and a thief may have used their phone to purchase a good or service on a specific date. The remote server computer could retrieve a record of the interaction and determine the variable value associated with that interaction. If the variable value was the variable value associated with the phone, and the user could provide proof or evidence the phone was out of their possession before that specific date, (e.g., a filed police report), the use of a variable value could confirm that the user did not make that transaction. Had a variable value not been used in generating the access token, it would not be possible to verify which device actually made the transaction.

Using a salt in addition to a variable value helps obfuscate the access token and ensure that the access tokens are generated are unique in the overall system. The chance that two access tokens will have the same numbers is very low.

An embodiment relates to a method in which a first user device receives an access token generated by a second device using a primary access identifier, along with a variable value and a salt. The first user device stores the access token, the variable value, and the salt. The first user device provides the access token, variable value, and salt to an access device in an interaction. Thereafter, the access device generates an authorization request message including the access token, the variable value, and the salt. The access device transmits the authorization request message to a remote server computer. The remote server computer determines the primary access identifier and uses the primary access identifier to determine if a user of the first user device is authorized to conduct the interaction.

Another embodiment relates to a first user device including a processor and a non-transitory computer readable medium coupled to the processor, the non-transitory computer readable medium including code executable by the processor for performing the above-noted method.

Another embodiment relates to a remote server computer including a processor and a non-transitory computer readable medium coupled to the processor, the non-transitory computer readable medium including code executable by the processor for performing a method in which a remote server computer receives an authorization request message including an access token, a variable value, and a salt, each corresponding to a first user device. The remote server computer determines a primary access identifier based on the authorization request message. The remote server computer determines if a user of the first user device is authorized to conduct the interaction based on the primary access identifier.

These and other embodiments of the invention are described in further detail below.

Terms

Prior to discussing specific embodiments, some terms may be described in detail.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may include one or more computational apparatuses and may use any of a variety of computing structures, arrangements, and compilations for servicing the requests from one or more client computers.

A "memory" may be any suitable device or devices that can store electronic data. A suitable memory may include a non-transitory computer readable medium that stores instructions that can be executed by a processor to implement a desired method. Examples of memories may include one or more memory chips, disk drives, etc. Such memories may operate using any suitable electrical, optical, and/or magnetic mode of operation.

A "processor" may refer to any suitable data computation device or devices. A processor may include one or more microprocessors working together to accomplish a desired function. The processor may include a CPU that includes at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "secure element" can refer to a component that can perform a function securely. A secure element may be a memory that securely stores data, such that its access is protected. An example of a "secure element" is a Trusted Execution Environment (TEE), a secure area of a processor. Another example of a secure element is a Universal integrated-circuit card (UICC), a secure smart card. Yet another example of a secure element is an embedded secure element, an embedded hardware component in a larger mechanical or electrical system. Another example of a secure element is a hardware security module (HSM), a physical computing device that can safeguard and manage cryptographic keys for authentication and provide crypto-processing functions.

A "user" can be a person or thing that employs some other thing for some purpose. A user may include an individual that may be associated with one or more personal accounts and/or user devices. The user may also be referred to as a cardholder, account holder, or consumer in some embodiments.

A "user device" may include any suitable device that can be used by a user. A user device may provide remote or direct communication capabilities. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of user devices include desktop computers, videogame consoles, mobile phones (e.g., cellular phones), PDAs, tablet computers, net books, laptop computers, personal music players, hand-held specialized readers, smart cards, etc. Further examples of user devices include wearable devices, such as smart watches, fitness bands, ankle bracelets, rings, earrings, etc., as well as automobiles with remote or direct communication capabilities. A user device may include any suitable hardware and software for performing such functions, and may also include multiple devices or components (e.g., when a device has remote access to a network by tethering to another device—i.e., using the other device as a modem—both devices taken together may be considered a single user device).

An "interaction" can be a reciprocal action, effect, or influence. An interaction, for example, could be an exchange or transaction between two or more parties.

An "access token" can be a substitute for a real credential. An access token can be used to access a resource or in an interaction between two entities. In some embodiments, an access token may be a substitute for a primary access identifier, such as a primary account number (PAN). For example, an access token may include a series of alphanumeric characters that may be used as a substitute for a primary access identifier. For example, an access token "4900 0000 0000 0001" may be used in place of a PAN "4147 0900 0000 1234." In some embodiments, an access token may be "format preserving" and may have a numeric format that conforms to the account identifiers used in existing transaction processing networks (e.g., ISO 8583 financial transaction message format). Some access tokens may be "diversified tokens" or "D-tokens," access tokens that have been made more varied as part of their generation.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a mobile communication or payment device. In some embodiments, where an access device may include a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

"Tokenization" can refer to a process by which data is replaced with substitute data. For example, a primary access identifier (e.g., a primary account number (PAN)) may be tokenized by replacing the primary access identifier with a substitute number (e.g., a token) that may be associated with the primary access identifier. Further, tokenization may be applied to any other information which may be replaced with a substitute value (i.e., a token).

A "remote server computer" can include a computer that remotely performs a service for a client computer or device. As an example, a remote server computer can include a computer that services access tokens. In some embodiments, a remote server computer can facilitate requesting tokens, processing tokens, as well as maintaining an established mapping of tokens to credentials such as primary account numbers (PANs) in a repository (e.g., a token vault). In some embodiments, the remote server computer may establish a token assurance level for a given token to indicate the confidence level of the token to PAN binding. The remote server computer may include or be in communication with a token vault. The remote server computer may support token processing of payment transactions submitted using access tokens by de-tokenizing the access token to obtain the actual primary access identifier.

A "token vault" may be an example of a token service and can include a repository that maintains established token mappings. It may be present in a remote server computer.

According to various embodiments, the token vault may also maintain other attributes of token holders. The attributes may be used by the remote server computer to apply domain restrictions or other controls during transaction processing. In some embodiments, the token vault may be a part of the remote server computer. Alternatively, the token vault may be a remote repository accessible to the remote server computer. Token vaults, due to the sensitive nature of the data mappings that are stored and managed in them, may be protected by strong underlying physical and logical security.

"Token exchange" or "de-tokenization" can include a process of restoring the data that was substituted during tokenization. For example, a token exchange may include replacing an access token with a corresponding primary access identifier or primary account number (PAN) that was associated with the access token during tokenization of the primary access identifier. Thus, the de-tokenization may refer to the process of redeeming an access token for the associated primary access identifier value. The ability to retrieve a primary access identifier in exchange for the associated access token may be restricted to specifically authorized entities, individuals, applications, or systems. Further, de-tokenization or token exchange may be applied to any other information. In some embodiments, token exchange may be achieved via a transactional message, such as an ISO message, an application programming interface (API), or another type of web interface (e.g., web request). Token exchange may also be achieved via a credential request message, whereby a requesting entity, which may be a token holder, makes a request to receive a primary access identifier associated with an access token.

A "resource provider" may be an entity that can provide resources. Examples of resource providers include merchants, governmental agencies, etc. A resource provider may operate a "resource provider computer."

A "merchant" may typically be an entity that engages in transactions and can sell goods or services, or provide access to goods or services.

An "acquiring entity" is an entity which can come into possession of something. An acquiring entity may be a business entity (e.g., a commercial bank) that has a business relationship with a particular merchant or other entity. An acquiring entity may operate an acquiring entity computer, which may be generically referred to as a "transport computer."

An "authorizing entity" is an entity which can authorize or approve interactions. An authorizing entity may typically refer to a business entity (e.g., a bank) that maintains an account for a user and is capable of authorizing interactions such as payment transactions, for example the purchase of goods or services. An authorization entity may operate an "authorization computer."

An "authorization request message" may be an electronic message that requests authorization for an interaction. In some embodiments, it is sent to an authorization computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also include additional data elements corresponding to "identification information" or "user information" including, by way of example only: a service code, a CVV (card verification value), a dCVV (dynamic card verification value), a PAN (primary account number or "account number"), an access token, a user identifier (e.g., user name), an expiration date, etc. An authorization request message may also include "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

A "salt" may include a random or pseudorandom number included as part of a process. As an example, a salt may be a random number used in a cryptographic operation in order to further obfuscate data. In embodiments of the invention, a salt can be used advantageously to prevent malicious users from generating their own fraudulent access tokens. A malicious user not only needs to determine the primary access identifier and cryptographic key, but also must correctly guess a random or pseudorandom number.

A "variable value" may include a value that can be provisioned or assigned to a user device, and may be used to generate an access token for that user device. A different variable value can be provided to another user device and may be used to generate a different access token for that other user device. The variable value for the first user device may be different than the variable value for the second user device, resulting in different access tokens for the first user device and the second user device. In some embodiments, an originating device can have a counter or "diversified counter" that can produce variable values. For example, a counter or diversified counter may increase every time a user device is provisioned with an access token. Alternatively, a variable value may be a random or arbitrary number, provided that no two user devices of a user are assigned the same variable value.

In some embodiments, the variable value can uniquely identify a user device, and does not change once it is assigned or associated with that user device. As no two user devices belonging to the same user possess the same variable value, the use of variable values guarantees that no two user devices belonging to the same user possess the same access token. Thus the variable value can be used to identify the device that a given access token was issued to. This can be advantageous in a number of contexts, for example, when a user is contesting an interaction. A remote server computer can determine the variable value based on its record of the interaction, and consequently the device with which the interaction was performed. This can help prove that a user did not perform an interaction, for example, if that particular device was lost or stolen before the interaction was performed.

A "cryptographic key" can refer to something used to encrypt or decrypt data. In some cases, a cryptographic key may include a number or sequence of numbers that can be used along with a cryptographic operation to encrypt "plaintext" data, producing "ciphertext." Alternatively, a cryptographic operation my decrypt ciphertext to produce the corresponding plaintext data. A cryptographic key may correspond to a cryptosystem, for example, the Advanced Encryption Standard (AES). A cryptographic key may be used in symmetric cryptography, where a cryptographic key used to encrypt data is identical to a cryptographic key used to decrypt data. A cryptographic key may be used in asymmetric cryptography, where one cryptographic key is used to encrypt data and a distinct cryptographic key is used to decrypt data. In some cases, these may be referred to as a public-private key pair.

"Format preserving encryption" can include encryption methods that maintains some characteristic of the plaintext. For example, format preserving encryption could produce ciphertext outputs that are of the same character length of the plaintext inputs. As another example, format preserving encryption could produce ciphertext outputs where some characters are maintained between the inputs and outputs. For example, the plaintext "AG322" could be encrypted as "A0x02." Both the length (five characters) and the first and last character (A and 2 respectively) were preserved in the encryption process.

The term "Master Derivation Key" or MDK can refer to a cryptographic key used to produce other cryptographic keys. For example, an MDK could be used to encrypt a primary access identifier to produce a cryptographic key corresponding to that primary access identifier. This cryptographic key may be referred to as a "Unique Diversified Key" or UDK.

A "diversified cryptographic key," "Diversified UDK," or "D-UDK," may refer to a UDK that has been combined with other data and encrypted to produce a new cryptographic key. For example, a UDK may be combined with a salt and a variable value then encrypted to produce a diversified cryptographic key.

A "cryptogram" can include an encrypted data element. A cryptogram can be transmitted between devices in order to prevent eavesdropping by third parties. A cryptogram may be generated by encrypting data or the hash of the data using a cryptographic key, and may be transmitted by a sending party to a receiving party. The receiving party may then decrypt the cryptogram using a cryptographic key and examine its contents. In some embodiments, symmetric cryptographic keys may be used, and the cryptographic key used to encrypt the cryptogram may be the same as the cryptographic key used to decrypt the cryptogram. A "verification cryptogram" can be a cryptogram used to verify something. As an example, a verification cryptogram may be sent alongside an access token, and may be analyzed by a remote server computer in order to verify the legitimacy of the access token. In some cases, a verification cryptogram does not necessarily need to be decrypted as part of verification. Instead, a remote server computer or other receiving entity may use received information to generate its own cryptogram, and compare that cryptogram against the verification cryptogram, verifying the verification cryptogram by determining that it matches the cryptogram generated by the remote server computer or the receiving entity.

BRIEF DESCRIPTION OF THE DRAWINGS

FIGS. 5A and 5B show a process flow diagram detailing communications between devices according an embodiment of the invention.

DETAILED DESCRIPTION

The following sections discuss embodiments of the invention in greater detail with references to the figures when necessary. In general, embodiments relate to methods and systems of offline provisioning of access tokens. These access tokens can act as a substitute for a primary access identifier. For example, an access token used to access a building can be generated by a user device and provided to other user devices. The user may use their other devices and the access token to access a protected resource (such as the building) rather than providing a primary access identifier (such as a key code for the building). These access tokens may be generated based on a primary access identifier, a variable value, and a salt, such as a randomly or pseudo-randomly generated number.

Figure 1:
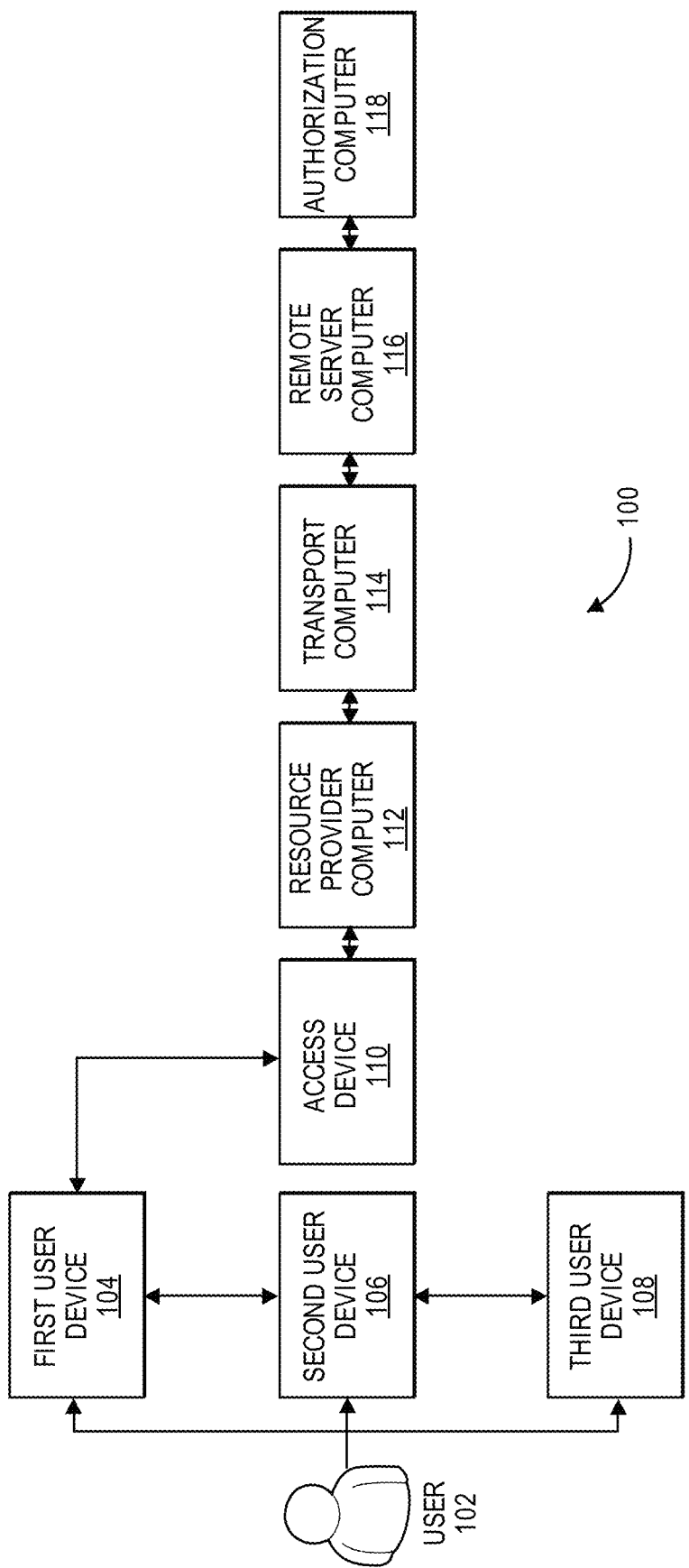
FIG. 1 shows a block diagram of a system according to an embodiment of the invention.

FIG. 1 shows a block diagram of a system 100 according to some embodiments of the invention. The system includes a user 102, a first user device 104, a second user device 106, a third user device 108, an access device 110, a resource provider computer 112, a transport computer 114, a remote server computer 116, and an authorization computer 118. Although three user devices are explicitly shown, some embodiments provide for any number of user devices. The entities in the network may be in operative communication with one another, either directly or indirectly. In some cases, these entities may communicate with one another over a communications network.

This communications network can take the form of any suitable communication network, which may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the entities, providers, networks, and devices may be transmitted using a secure communications protocols such as, but not limited to, File Transfer Protocol (FTP); Hypertext Transfer Protocol (HTTP); Secure Hypertext Transfer Protocol (HTTPS), Secure Socket Layer (SSL), ISO (e.g., ISO 8583) and/or the like.

Figure 2:
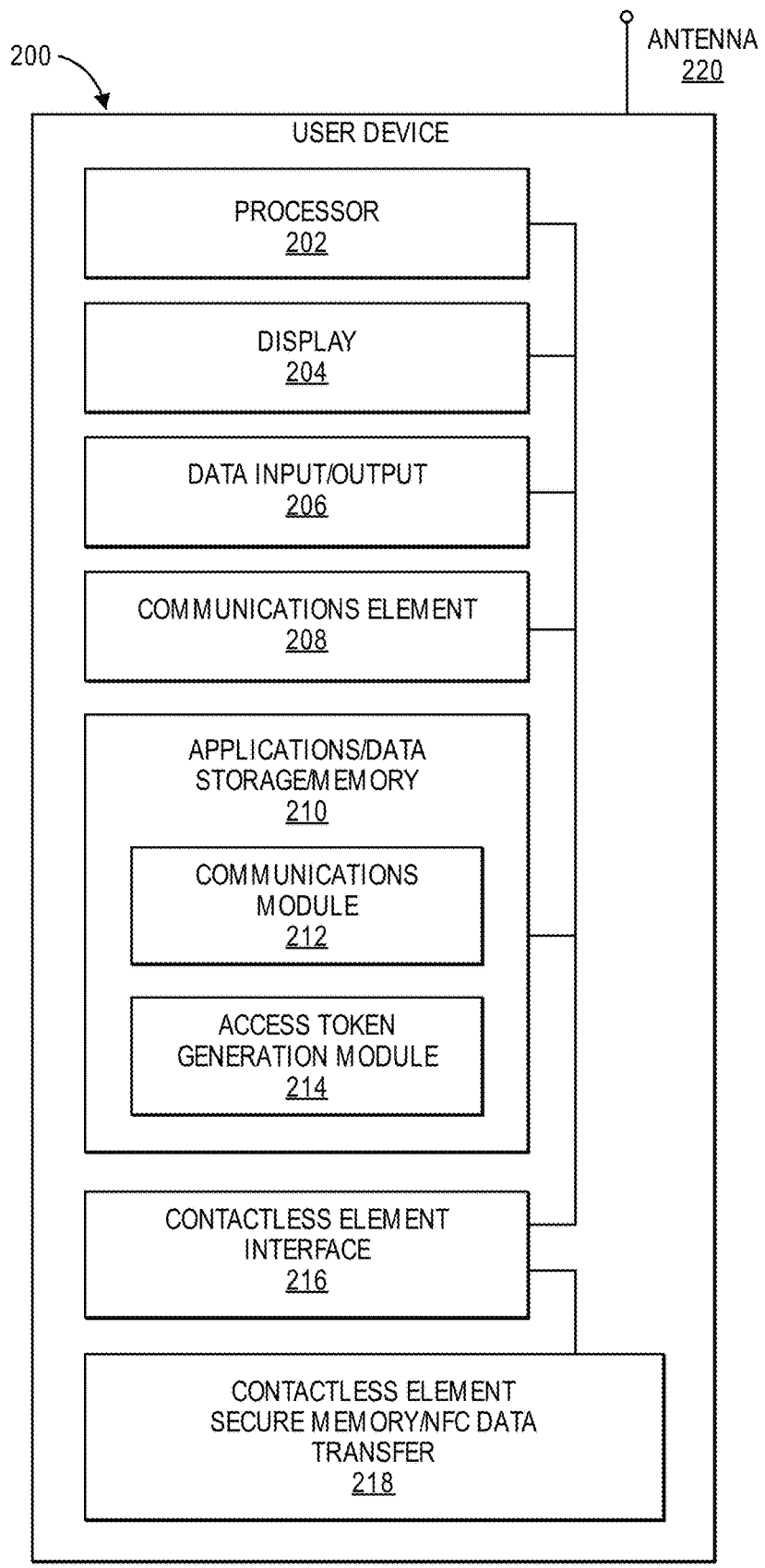
FIG. 2 shows a block diagram of a user device according to an embodiment of the invention.

FIG. 2 shows an example of a user device 200 according to some embodiments of the invention. User device 200 may include circuitry that is used to enable certain device functions, such as wireless communication or telephony. The functional elements responsible for enabling those functions may include a processor 202 that can execute instructions that implement the functions and operations of the device. Processor 202 may access the data storage 210 (or another suitable memory region or element) to retrieve instructions or data used in executing the instructions, such as provisioning scripts and mobile applications. Data input/output elements 206, such as a keyboard or touchscreen, may be used to enable a user to operate the user device 200 and input data (e.g., user input data). Data input/output elements may also be configured to output data (via a speaker, for example). Display 204 may also be used to output data to a user. Communications element 208 may be used to enable data transfer between user device 200 and a wired or wireless network (via antenna 220, for example), enable data transfer functions, and may be used to assist in connectivity to the Internet or another network. User device 200 may also include contactless element interface 216 to enable data transfer between contactless element 218 and other elements of the device, where contactless element 218 may include a secure memory and a near field communications data transfer element (or another form of short range communications technology). As noted, a cellular phone, wearable device, laptop computer, or other similar device is an example of a user device 200 that may be used in accordance with embodiments of the present invention. As noted, a smart card or similar device is also an example of a user device 200 that may be used in accordance with embodiments of the invention. In some cases, the user device may not include some of the components listed above. For example, a user device 200 in the form of a smart card may not possess a display 204.

The data storage 210 may include a computer readable medium including code, executable by the processor 202 to implement a method. This method may involve communications between a number of user devices, such as a first user device, a second user device, and a third user device, along with an access device. The method may include: receiving, by a first user device, from a second user device, an access token, the access token generated by the second user device using a primary access identifier, a variable value, and a salt; storing, by the first user device, the access token, the variable value, and the salt; and providing, by the first user device to an access device in an interaction, the access token, the variable value, and the salt, the access device thereafter generating an authorization request message including the access token, the variable value, and the salt, and transmitting the authorization request message to a remote server computer that then determines the primary access identifier and then uses the primary access identifier to determine if a user of the first user device is authorized to conduct the interaction.

The method may additionally include: receiving, by the first user device, from the second user device, an encrypted version of the primary access identifier and providing, by the first user device to an access device in an interaction, the encrypted version of the primary access identifier, where the authorization request message further includes the encrypted version of the primary access identifier, and where the remote server computer decrypts the encrypted version of the primary access identifier to determine the primary access identifier. Alternatively, the encrypted version of the primary access identifier may be passed by the remote server computer to an authorization computer, and the authorization computer can decrypt the encrypted version of the primary access identifier to determine the primary access identifier. In this case, the authorization computer may further use the primary access identifier to determine if a user of the first user device is authorized to conduct the interaction.

The method may additionally include: receiving, by a third user device, from the second user device, a subsequent access token generated by the second user device using the primary access identifier, a subsequent variable value and a subsequent salt and storing, by the third user device, the subsequent access token, subsequent variable value, and subsequent salt.

The method may further include: receiving, by the first user device, from the second user device, a diversified cryptographic key; generating, by the first user device, a verification cryptogram using the diversified cryptographic key, and providing, by the first user device to an access device in an interaction, the verification cryptogram, where the authorization request message further includes the verification cryptogram, and where the remote server computer uses the verification cryptogram to determine if the user of the first user device is authorized to conduct the interaction. This method is discussed in further detail below, with reference to FIGS. 5A-6.

The data storage 210 may include a computer readable medium that may also include a number of software modules, such as a communications module 212, and an access token generation module 214, as well as any number of encrypted or secure memory regions that may restrict access to protected resources, such as encryption keys, access tokens, cryptographic keys, such as diversified cryptographic keys, unique diversified keys, diversified unique diversified keys, issuer application data, primary access identifiers, PANs, and assorted user information among others.

The communications module 212 may include code enabling the processor 202 to implement or enable communications between the user device 200 and other devices, such as other user devices (such as the second user device 106 or third user device 108 from FIG. 1), or an access device, such as the access device 110 from FIG. 1. The communication module 212 may allow communication according to any appropriate protocol, such as the Transmission Control Protocol (TCP) or the User Datagram Protocol (UDP). It may enable secure communication by establishing a secure or encrypted communication channel between the user device 200 and other devices. For example, the communications module may include code executable by the processor for performing a key exchange, such as a Diffie-Hellman key exchange, between the user device 200 and another device, such as an access terminal or another user device. The communication module 212 may further allow the transmission of access tokens, diversified cryptographic keys, primary access identifiers, or other user information to other devices, such as other user devices or an access device.

The access token generation module 214 may include code, executable by the processor 202 to generate an access token. This access token may be generated in a number of ways. According to some embodiments, the access token may be generated by combining user information along with a variable value and a salt in order to produce an access token. As an example, the access token generation module 214 may enable the processor to serially concatenate electronic representations of the primary access identifier, user name or initials, salt, and variable value, then encrypt the result using an encryption key, such as a Triple DES (3DES) encryption key. For a user "AG," with primary access identifier "12345," salt "322" and variable value "0" an exemplary concatenation result may include "12345AG3220." This concatenated value may be then encrypted to produce an access token. In some cases, format preserving encryption may be used, such that the resulting token maintains some qualities of the unencrypted information. For example, the leading digits of the encrypted result may be the same as the leading digits of the unencrypted result.

The access token generation module 214 can include code, executable by the processor 202 to generate random or pseudorandom numbers for the purpose of generating the salt. These can include any number of random number generation (RNG) or pseudorandom number generation (PRNG) algorithms, including cryptographically secure random or pseudorandom number generators. Additionally, in some embodiments, the access token generation module 214 may include code, executable by the processor 202 to produce subsequent variable values. For example, the variable value could be a counter value or diversified counter value that initially is set to "0." This variable value may be used by the processor 202 to generate a first access token for a first user device, as in the above example. At a later time, the processor 202 may increment the counter, producing a subsequent variable value "1," and use that value to produce a subsequent access token for another user device, such as a third user device. Alternatively, variable values may themselves be random or otherwise arbitrary numbers, provided that no two user devices belonging to the same user are associated with the same variable value. For example, a first user device may receive a variable value "23" and a second user device may receive a variable value "79"

The use of variable values and salts enable multiple unique access tokens to be produced from a single primary access identifier. By using variable values, a user can always have a unique access token for each of their user devices. By using a salt, it is significantly more difficult for a hacker or malicious actor to generate their own access tokens, as they have to successfully guess a random or pseudorandom number. The use of both a variable value and a salt enables both of these advantages.

In some cases, the encryption process may completely obfuscate the user information and primary access identifier, such that an observer cannot determine the primary access identifier or user name without decrypting the access token. In other cases, the encryption process may be format preserving or partially format preserving. For example, the first one or two digits of the primary access identifier may be preserved, while the remaining digits or characters may be altered, i.e., "12898987979" as the encrypted version of "12345AG3220."

This form of format preservation may be useful in routing the access token to its intended destination. In some cases, the leading digits of primary access identifier are used to identify the recipient or an entity associated with that primary access identifier. In the case of a PAN, for example, the leading digits may include the Bank Identification Number, or BIN, a unique identification of the institution that issued the PAN.

Another example of format preservation may refer to encryption techniques that maintain or ensure a certain output length. This may be relative to the data being encrypted, for example, an encryption system may ensure that the length of the output cipher text is identical to the length of the input plaintext. In other cases, format preservation may ensure that the length is suitable for subsequent processes or operations using the encrypted data.

In the example above, where the primary access identifier, user initials, salt, and variable value are concatenated and then encrypted to produce the access token, it may be that the encryption results in an access token that is the same length as the primary access identifier. As another example, the encrypted result may be longer than the primary access identifier. In this case, numbers or characters from the encrypted result could be discarded such that after discarding, the encrypted result is the same length. Alternatively, if the encrypted result is shorter than the primary access identifier, numbers or characters could be appended to the encrypted result.

There are a number of other ways in which an access token may be generated by combining user information and performing an encryption operation, the above is intended only as a single non-limiting example.

The access token generation module 214 may additionally include code enabling the processor 202 to generate cryptographic keys, unique diversified keys (UDK), or diversified cryptographic keys (D-UDKs). In some cases, the access token generation module 214 may include code, executable by the processor 202 to generate a UDK by encrypting a primary access identifier using a master derivation key (MDK). This could involve encrypting a payment account number using the MDK to produce the UDK. In other cases, the user device 200 can already have a UDK stored in secure memory of the contactless element 218, and may not need to generate a UDK on its own.

Further, the access token generation module 214 may include code enabling the processor 202 to generate diversified cryptographic keys from UDKs. For example, the access token generation module 214 may include code enabling the processor 202 to combine a UDK with a variable value and a salt, and then encrypt the combination to produce a diversified cryptographic key. This combination could be serial concatenation as described above, or another combination method, such as by calculating the exclusive or (XOR) of the UDK, salt, and variable value, then encrypting the combination to produce the diversified cryptographic key. In another example, the access token generation module 214 may include code enabling the processor 202 to encrypt the primary access identifier using a cryptographic key to produce an encrypted version of the primary access identifier. The above are intended only as non-limiting examples.

Additionally, the access token generation module 214 may include code enabling the processor to generate verification cryptograms. These verification cryptograms can later be used by a remote server computer, such as the remote server computer 116 from FIG. 1 to verify an interaction. The verification cryptogram can be generated by encrypting interaction details using a diversified cryptographic key. These interaction details can include information such as the date and time at which the interaction took place, the parties or entities involved in the interaction, among other things. For example, in a transactional interaction, interaction details could include an amount paid to a merchant by a user.

The access token generation module 214 may include code, executable by the processor 202 to store any generated values securely in either data storage 210 or secure memory of the contactless element 218, as needed or appropriate.

Figure 3:
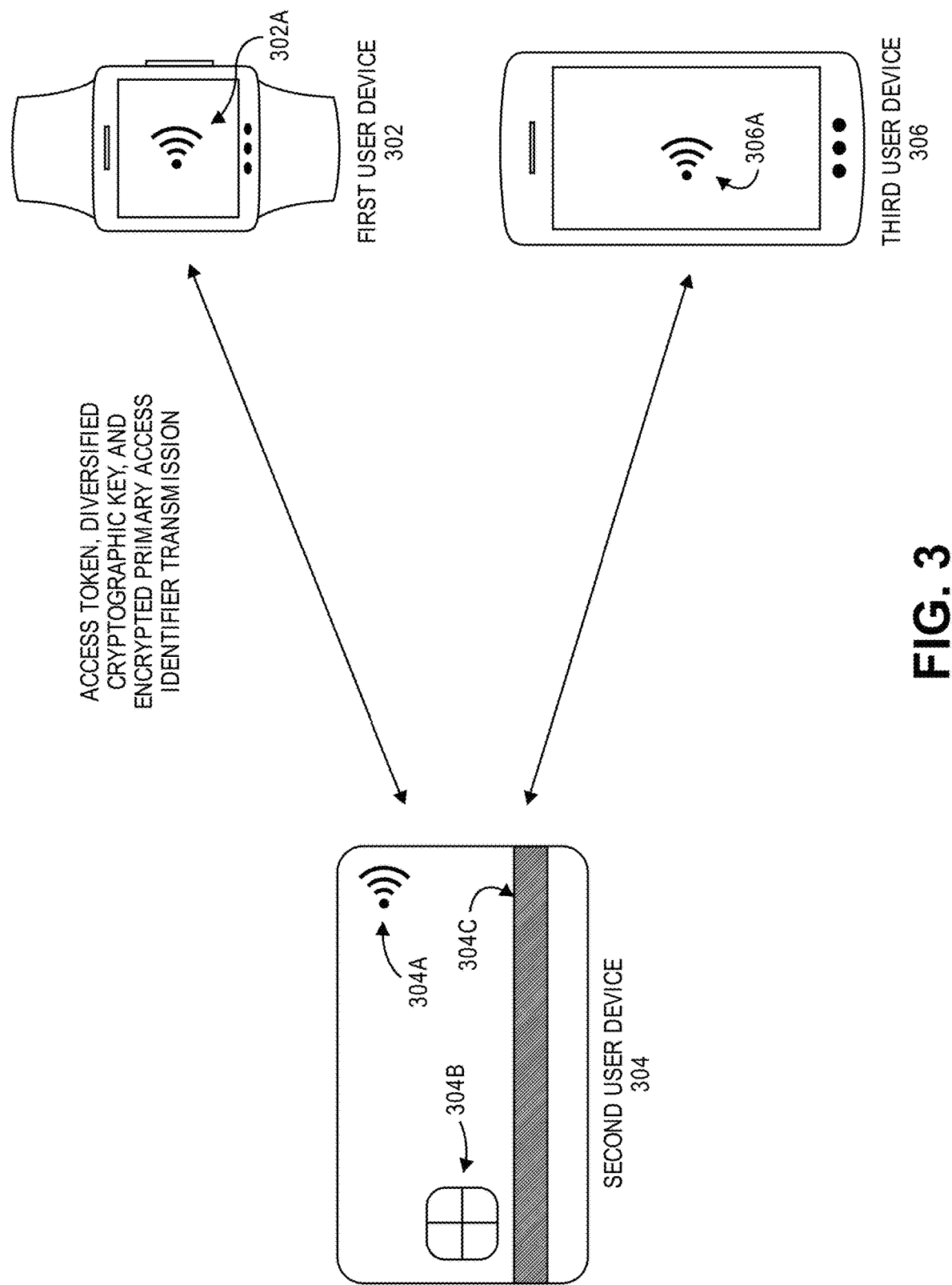
FIG. 3 shows a diagram of different user devices according to an embodiment of the invention.

FIG. 3 shows a diagram of three user devices, a first user device 302, a second user device 304, and a third user device 306, in operative communication with one another. In FIG. 3, the first user device 302 is shown as a smart watch, a specific instance of a wearable device. The first user device 302 can additionally include a contactless element 302A, such as an NFC enabling wireless interface. The second user device 304 is shown in the form of a smart card with a wireless or contactless element 304A, a contact element 304B, and a magnetic strip 304C. The third user device 306 is shown in the form of a smart phone and can additionally include a contactless element 306A. It should be understood that the first, second, and third user devices 302-306 are not restricted to the forms shown here, and that a user device may take on any of the forms described above.

The second user device 304 can generate an access token using a primary access identifier, variable value, salt, and user information, generate a diversified cryptographic key using a UDK, the variable value and the salt, and generate an encrypted version of the primary access identifier. These values may be received by the first user device 302, for example, via NFC using the contactless element 302A, from the second user device 304 and stored by the first user device 302. At another time, the second user device 304 can generate a subsequent access token and a subsequent diversified cryptographic key using the primary access identifier, a subsequent variable value (such as a counter value one greater than the variable value used to generate the access token) and a subsequent salt (such as a newly generated random or pseudorandom value.) This subsequent access token can be received by the third user device 306, for example, via NFC using the contactless element 306A, from the second user device 304 and stored by the third user device 306.

Figure 4:
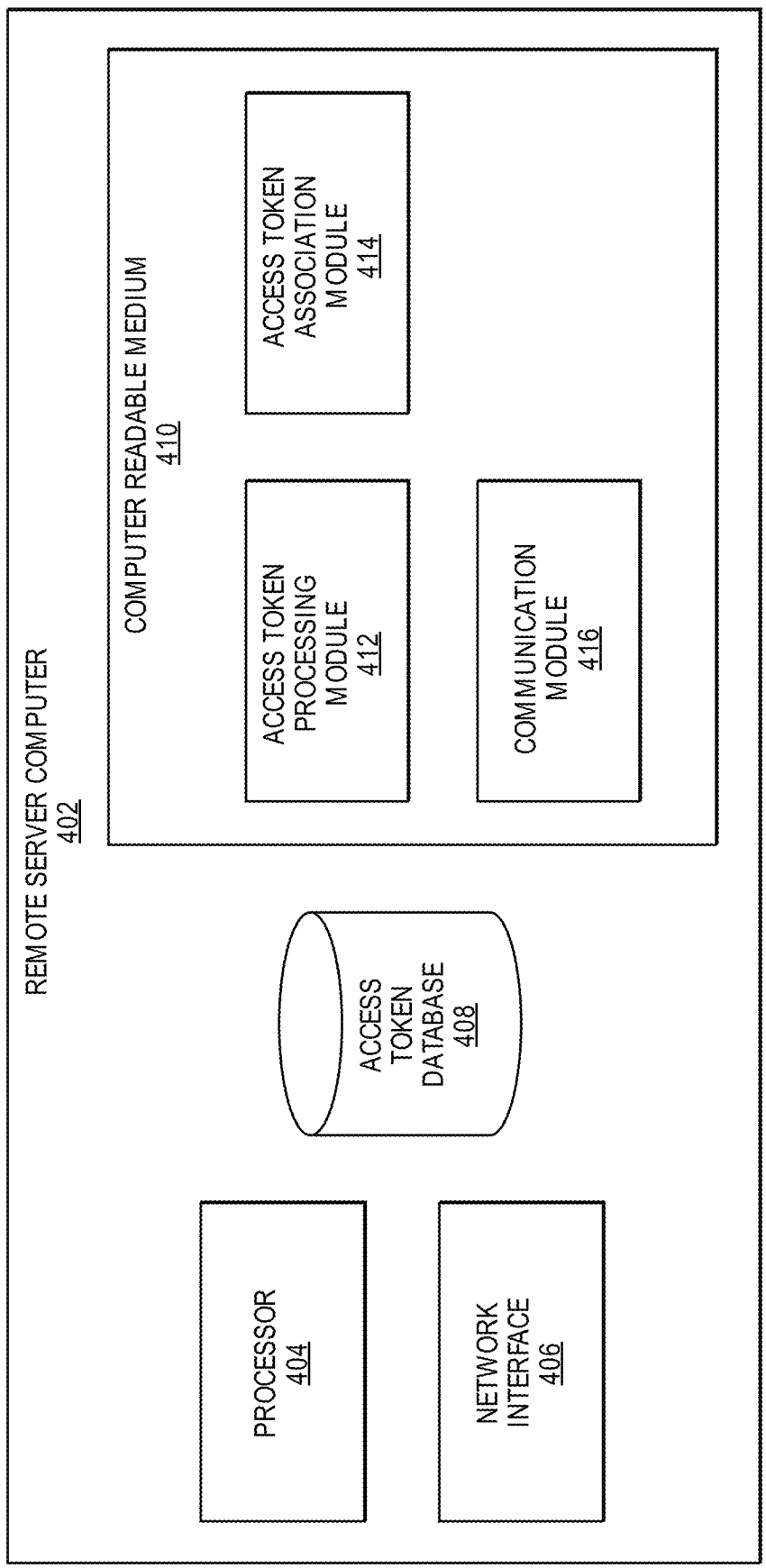
FIG. 4 shows a diagram of a remote server computer according to an embodiment of the invention.

FIG. 4 shows a block diagram of basic components that may reside in an exemplary remote server computer 402. The remote server computer 402 may be form part of a payment processing network in some embodiments of the invention. The remote server computer 402 may include a processor 404, a network interface 406, an access token database 408, and a computer readable medium 410.

The computer readable medium 410 may include a non-transitory computer readable medium coupled to the processor 404. The computer readable medium may include software modules including an access token processing module 412, an access token association module 414 and a communication module 416. It may also include code, executable by the processor 404 for implementing a method including: receiving by the remote server computer 402, as part of an interaction, an authorization request message including an access token, a variable value, and a salt, each corresponding to a first user device; determining, by the remote server computer 402, a primary access identifier based on the authorization request message; and determining, by the remote server computer, if a user of the first user device is authorized to conduct the interaction.

The method may further include: receiving, by the remote server computer 402, a first verification cryptogram; generating, by the remote server computer 402, based on the primary access identifier, the variable value and the salt, a unique diversified key; generating, by the remote server computer 402, a second verification cryptogram based on the unique diversified key, the access token, and the interaction information; and comparing, by the remote server computer 402, the verification cryptogram against the second verification cryptogram, where the user of the first user device is authorized to conduct the interaction if the second verification cryptogram matches the first verification cryptogram.

The method may further include: storing, by the remote server computer 402, the access token in a secure database (such as access token database 408) in association with the primary access identifier.

The access token processing module 412 may include code enabling the processor 404 to process received access tokens. This may include de-tokenization or producing the primary access identifier associated with a received access token. The de-tokenization process can take many forms, the following is intended only as a non-limiting example.

The remote server computer 402 may receive an access token, along with a verification cryptogram, and interaction details, including a salt, variable value, and in some circumstances, an encrypted version of the primary access identifier as part of an authorization request message during an interaction. In some embodiments, the remote server computer 402, using code present in the access token processing module 412 may decrypt the encrypted version of the primary access identifier, using either a symmetric cryptographic key or a cryptographic key of an asymmetric key pair to produce the primary access identifier. In other embodiments, the remote server computer 402 may decrypt the access token, using a symmetric or asymmetric cryptographic key as described above, in order to produce the encrypted information used to generate the access token. For example, if the access token was generated by serially concatenating the primary access identifier, user information or a user identifier, the variable value and the salt (e.g., 12345AG3320) and encrypting that data value, the remote server computer 402 would decrypt and produce the same data value "12345AG3320." This value could then be separated into its constituent elements in order to produce the primary access identifier "12345", user identifier "AG", variable value "0" and salt "322." Although the user identifier above is shown only as a set of initials, it should be understood that user identifier can take a number of forms, such as an expiration date, birth date, full user name, a verification value (such as a CVV or dCVV) among others.

As an alternative, the access token may have been generated by a user device, such as the second user device 106 from FIG. 1, by concatenating the primary access identifier and user information, then calculating the XOR of the concatenated value and the variable value and salt, and then encrypting the resulting value to produce the access token. In this case, the de-tokenization process may involve decrypting the access token, calculating the XOR of the resulting value with the received variable value and salt, then separating the resulting information to produce the primary access identifier and user information. It should be understood that the two prior examples are intended only as non-limiting examples, and there are a number of conceivable methods by which de-tokenization may be accomplished.

Additionally, the remote server computer 402 can perform verification by comparing the variable value and salt from the received authorization request message to the variable value and salt determined by decrypting the access token. As another form of verification, the remote server computer can attempt to generate a second verification cryptogram and compare it to the received verification cryptogram in order to verify the legitimacy of the interaction. In some embodiments, the received verification cryptogram may take the form of interaction details encrypted using a diversified cryptographic key or D-UDK. In some embodiments, the diversified cryptographic key can be generated by a user device by combining a UDK, variable value, and salt, then encrypting the combination with an encryption key.

The remote server computer 402, having determined the primary access identifier by decrypting the access token, may use the primary access identifier to generate a UDK using a copy of the master derivation key or MDK. By combining the generated UDK with the received variable value and salt, and then encrypting the result, the remote server computer can produce the diversified cryptographic key. Using the diversified cryptographic key, the remote server computer 402 can encrypt some or all of the interaction details in order to produce a second verification cryptogram. This second verification cryptogram can be matched against the first verification cryptogram in order to check if the two cryptograms match. If the two cryptograms match, the interaction details received as part of the authorization request message match the interaction details in the verification cryptogram, suggesting a legitimate or non-fraudulent interaction. The remote server computer 402 may determine, based on this comparison, whether the user of the first user device is authorized to conduct the interaction. In other embodiments, the remote server computer 402 may reform the authorization request message to replace the access token with the corresponding primary access identifier and forward the authorization request message to an authorization computer, such as the authorization computer 118 from FIG. 1.

The access token association module 414 may include code that causes the processor 404 to associate an access token with other user data (e.g., the user information received in the authorization request message, such as e-mail addresses, telephone numbers, primary access identifiers, etc.). For example the access token association module 414 may include code that causes the processor to link the access token received as part of an authorization request message to the primary access identifier determined from that access token, and to store the information or association in the access token database 408. This may be useful in subsequent interactions, as rather than performing de-tokenization by cryptographically processing the access token to determine the primary access identifier, the remote server computer 402 can instead perform a look-up in the access token database 408 to find the relevant information.

The communication module 416 may include code, executable by the processor 404 for generating messages, reformatting messages, and/or otherwise communicating with other entities. For example, the communication module may contain code that causes the processor 404 to identify an access token in a received authorization request message, reformat the authorization request message so that the interaction token is replaced with a primary access identifier, and forward the authorization request message to an authorization computer.

Figure 5A:
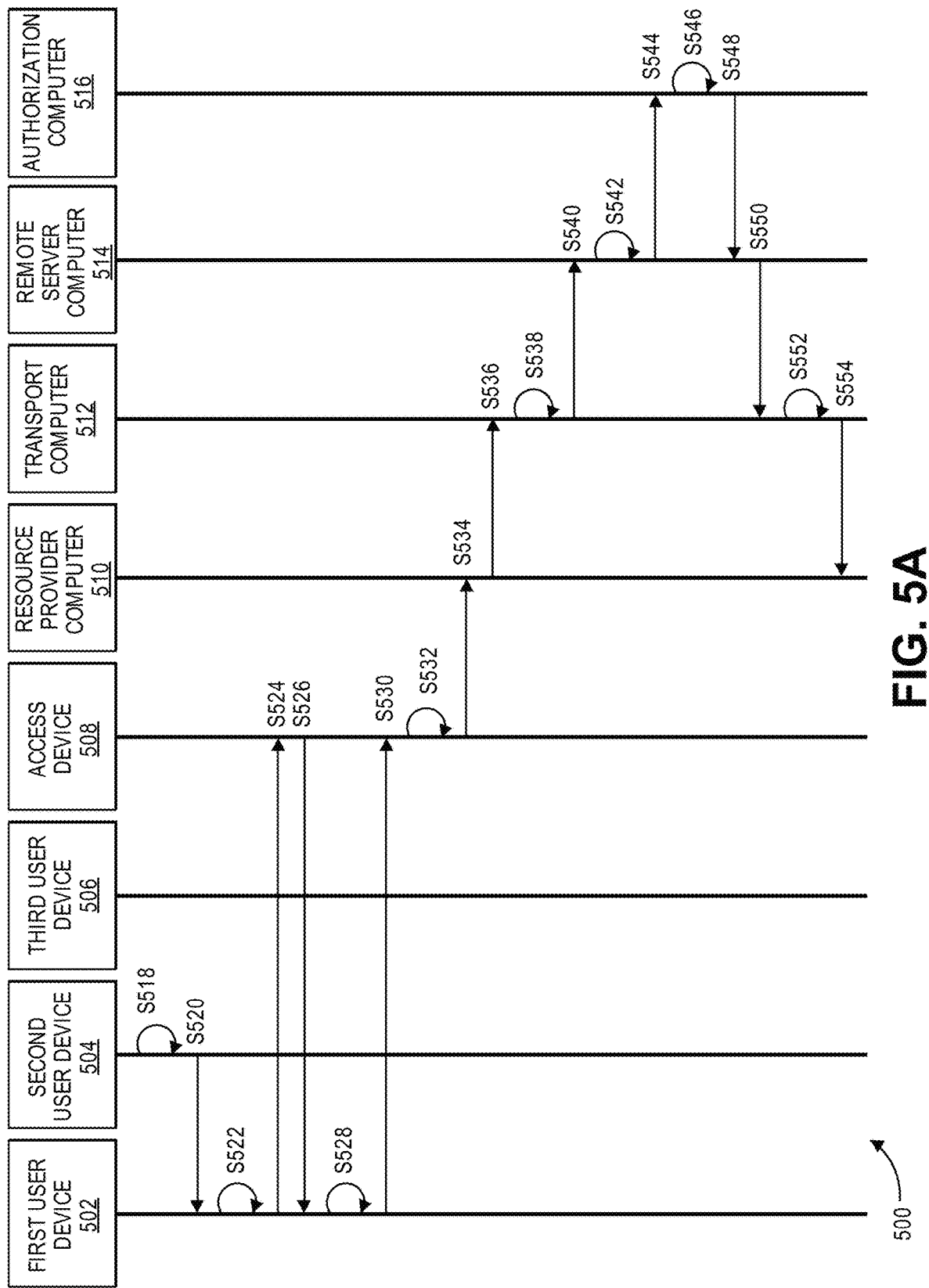

FIGS. 5A and 5B show a sequence diagram of a method 500 according to some embodiments, involving a system including a first user device 502, a second user device 504, a third user device 506, an access device 508, a resource provider computer 510, a transport computer 512, a remote server computer 514, and an authorization computer 516. Some elements in other figures may also be referred to. The steps shown in the method 500 may be performed sequentially or in any suitable order. In some embodiments, one or more of the steps may be optional.

Generally, the method 500 involves provisioning an access token to a first user device 502 (steps S518-S522), generating a verification cryptogram and providing the verification cryptogram and an access token to an access device 508 (steps S524-S530), generating and processing an authorization request to authorize an interaction (steps S532-S554), and provisioning an access token to a third user device 506 (steps S556-S560).

As a non-limiting example, the interaction may be a transaction, in which a user operates the first user device 502 to pay for a good or service from a merchant (resource provider) operating the access device 508 and the resource provider computer 510. The resource provider may communicate with the authorization computer 516 (e.g., an issuer computer) via the transport computer 512 (e.g., an acquirer computer) and the remote server computer 514 (e.g., a payment processing network).

In the case of a transaction, the remote server computer 514 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

The various messages in FIGS. 5A and 5B may use any suitable form of communication. In some embodiments, a request or response may be in an electronic message format, such as an e-mail, a short messaging service (SMS) message, a multimedia messaging service (MMS) message, a hypertext transfer protocol (HTTP) request message, a transmission control protocol (TCP) packet, or a web form submission. The request or response may be directed to any suitable location, such as an e-mail address, a telephone number, an internet protocol (IP) address, or a uniform resource locator (URL). In some embodiments, a request or response may include a mix of different message types, such as both email and SMS messages.

In general, the method involves the second user device 504 generating an access token and diversified cryptographic key and transmitting it to the first user device 502 that may store the access token and diversified cryptographic key. The first user device 502 stores and uses the access token and diversified cryptographic key as part of an interaction with an access device 508 that thereafter generates an authorization request message that is transmitted between a resource provider computer 510, a transport computer 512, a remote server computer 514, and an authorization computer 516. The authorization computer 516 generates an authorization response message that is transmitted back to remote server computer 514, transport computer 512, and resource provider computer 510, indicating whether the interaction has been authorized. At another time or concurrently, the method can involve the second user device 504 generating a subsequent access token and subsequent diversified cryptographic key and transmitting them to the third user device 506 that may store the subsequent access cryptogram, subsequent diversified cryptographic key, subsequent variable value, and subsequent salt.

At step S518, the second user device 504 may generate an access token by combining a primary access identifier, variable value, salt, and additional user information, such as a user name, CVV, dCVV, expiration date, etc. This may be accomplished by serially concatenating the primary access identifier, variable value, salt, and additional user information and encrypting the concatenated result with a cryptographic key to produce the access token. This access token may be referred to as an "access cryptogram." Additionally, the second user device 504 may generate a diversified cryptographic key. This may be accomplished by serially concatenating a UDK, variable value, and salt, and encrypting the result with a cryptographic key to produce the diversified cryptographic key.

At step S520, the first user device 502 can receive the access token from the second user device 504. This may be accomplished by any suitable communication protocol or method, such as Bluetooth, Wi-Fi, near field communication, direct interconnection, etc. Additionally, the first user device 502 may receive an encrypted version of the primary access identifier, a diversified cryptographic key, a variable value, and a salt. These data may be received via any suitable communication method and/or protocol. For example, the first user device 502 and the second user device 504 may establish a secure near field communication channel and the first user device 502 may receive the primary access identifier, diversified cryptographic key, variable value and salt in an encrypted form over the secure communication channel.

At step S522, the first user device 502 can store the access token, variable value, and salt. The first user device 502 may store these data on a secure element, such as a trusted execution environment, secure execution environment, or universal integrated circuit card, among others.

Figure 6:
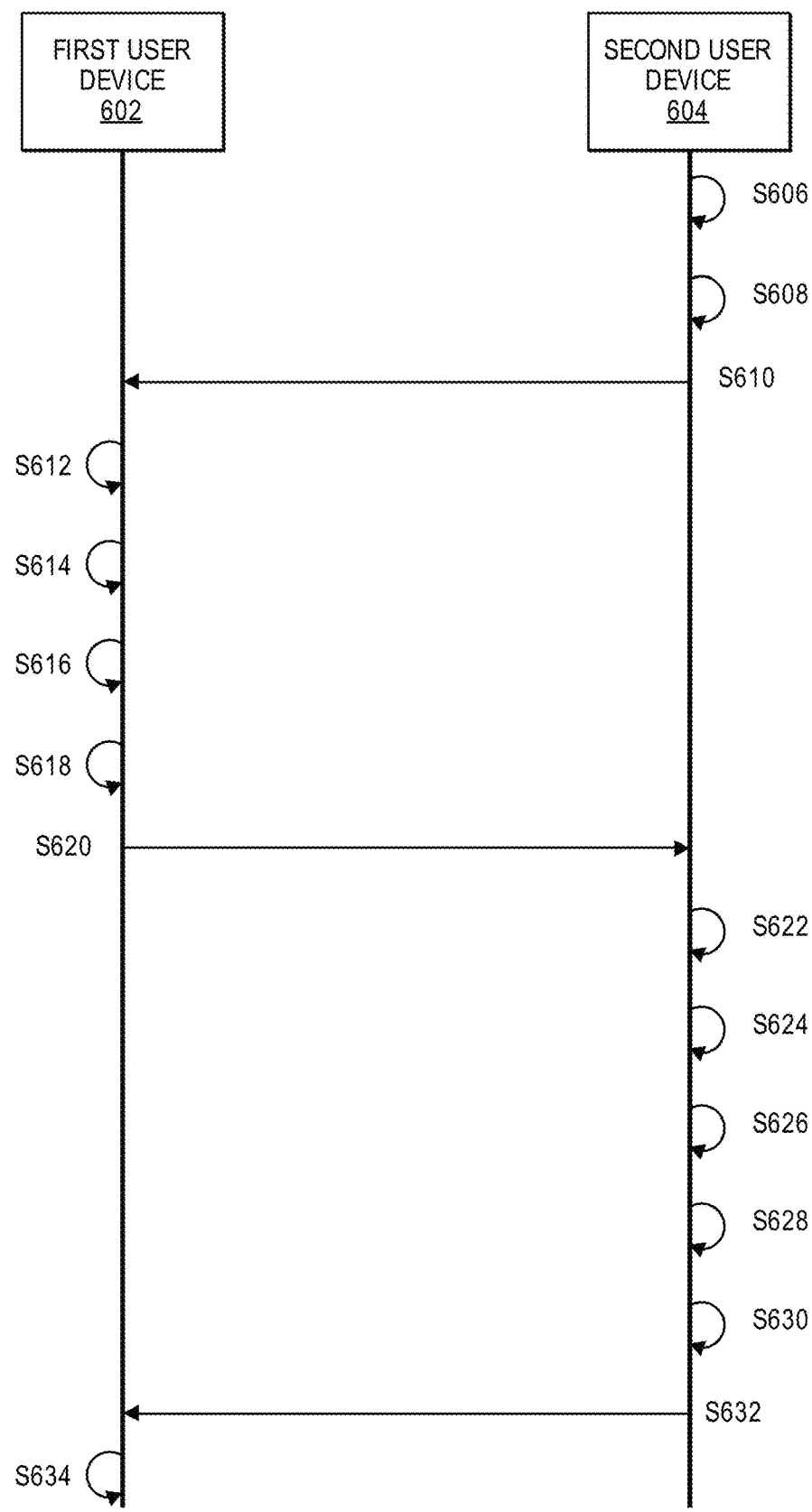
FIG. 6 shows a process flow diagram detailing communications between a first user device and a second user device according to an embodiment of the invention.

Steps S518-S522 can be better understood with reference to FIG. 6, which shows a process for offline provisioning of an access token according to some embodiments. This may include communications between a first user device 602 (such as a laptop or wearable device) and a second user device 604 (such as a smart card).

At step S606, the second user device 604 may generate a challenge message. This message may be used by the second user device 604 in order to establish a secure communication channel with which to communicate with the first user device 602. The challenge message may take a number of forms, such as a random or pseudorandom series of numbers or characters.

At step S608, the second user device 604 may encrypt the challenge message using a cryptographic key of a cryptographic key pair. For example, the second user device 604 may encrypt the challenge message using a symmetric cryptographic key, or may encrypt the challenge message using a public or private key of a public-private key pair.

At step S610, the second user device 604 may transmit the encrypted challenge message to the first user device 602. This may be accomplished through any suitable communication means and using any suitable communications protocol. For example, the second user device 604 could transmit the encrypted challenge message using near field communication, or via a direct interconnection, such as an I2C or USB interface.

At step S612, the first user device 602 may retrieve a cryptographic key for use in establishing a secure channel with the second user device 604. For example, if the second user device 604 is in the form of a smart card, the first user device 602 could use the EMVCo key retrieval protocol in order to retrieve the cryptographic key associated with the second user device 604.

At step S614, the first user device 602 can decrypt the encrypted challenge message using the retrieved cryptographic key.

At step S616, the first user device 602 can generate its own challenge message. This challenge message may be similar to the challenge message generated by the second user device 604 at step S606.

At step S618, the first user device 602 can generate and encrypt a challenge response message. The challenge response message may be generated as a combination of the challenge message generated by the first user device 602 and the challenge message generated by the second user device 604. For example, if the first user device 602 generates a challenge message "1234" and the second user device 604 generates a challenge message "5678," the unencrypted challenge response message could be "12345678." As another example, the challenge response message could include the challenge message generated by the first user device 602 exclusive-OR the challenge message generated by the second user device 604. There are numerous other conceivable ways in which a challenge response could be generated based on a number of challenge messages.

The challenge response message can be encrypted using the cryptographic key retrieved by the first user device 602 at step 612.

At step S620, the first user device 602 can transmit the encrypted challenge response message to the second user device 604. This can be accomplished in substantially the same way as in step 610. For example, the first user device 602 could transmit the encrypted challenge response message to the second user device 604 via NFC.

At step S622, the second user device 604 can decrypt the encrypted challenge response message using a cryptographic key in order to determine the challenge response message.

At step S624, the second user device 604 can verify the decrypted challenge response message by comparing the challenge response message against the challenge message generated at step 606. For example, if the challenge response message was generated by concatenating the challenge message generated by the first user device 602 and the second user device 604, the second user device 604 can separate the two challenge messages, and confirm that at least one of the two challenge messages matches the challenge message generated by the second user device 604 at step 606.

Once the challenge response message has been verified, the challenge response message can be used as, or used to generated a symmetric cryptographic key that can be used to encrypt all communications between the first user device 602 and the second user device 604 from that point on.

At step S626, the second user device 604 can generate an access token. In some embodiments, an access token can be generated using a primary access identifier (e.g., a PAN), a variable value (e.g., a counter value or diversified counter value) and a salt (e.g., a randomly generated value). Optionally, the access token may be generated using additional user information, such as an expiry date, a user name, a verification value (e.g., a card verification value CVV), and in some circumstances, track 2 magnetic strip data.

Generating the access token can be accomplished in a number of ways. As one example, the access token can be generated by concatenating the primary access identifier, variable value, salt, and optional additional user information and encrypting the result with a cryptographic key, such as a symmetric cryptographic key. As another example, the primary access identifier, variable value, and salt can be XOR with one another, and the resulting value can be encrypted using a cryptographic key.

At step S626, the second user device can generate a diversified cryptographic key. In some embodiments, the diversified cryptographic key can be generated using a UDK, the variable value, and the salt. Optionally, the diversified cryptographic key may be generated using additional user information, such as an expiry date, user name, verification value, etc.

Generating the diversified cryptographic key can be accomplished in a number of ways. As one example, the diversified cryptographic key can be generated by concatenating the UDK, the variable value, and the salt, and encrypting the result with a cryptographic key, such as a symmetric cryptographic key. As another example, the UDK, the variable value, and the salt can be XOR with one another, and the resulting value can be encrypting using a cryptographic key.

At step S630, the second user device 604 can encrypt the access token, diversified cryptographic key, salt, variable value, and any additional information, such as Issuer Application Data (IAD), using the challenge response message received in step S620.

At step S632, the second user device 604 can transmit the encrypted access token, diversified cryptographic key, salt, variable value, etc. to the first user device 602. In some embodiments, this may be accomplished by near field communication (NFC), or any other suitable communication means or protocol.

At step S634, the first user device 602 can decrypt the received information using the challenge response message generated at step S618. The first user device 602 can then store the access token, diversified cryptographic key, salt, variable value, and any other received information in secure memory. In some cases, this may include a secure execution environment, trusted execution environment, or universal integrated circuit card. In some cases, the access token, diversified cryptographic key, salt, variable value, and any other received information (such as issuer application data) may be obfuscated in a whitebox cryptogram.

Returning to FIG. 5A, at step S524, the first user device 502 can provide the access token, the variable value, and the salt to an access device 508 in an interaction. As one example, the access device 508 could be a point of sale terminal, and the first user device 502 could be providing the access token, the variable value, and the salt to the access device 508 as part of a transaction. This can be accomplished using any suitable means of communication.

At step S526, the access device 508 can transmit interaction information back to the first user device 502. This interaction information can be used by the first user device 502 in order to generate a verification cryptogram. The interaction information can include any information relevant to the interaction between the access device 508 and the first user device 502. For example, if the interaction is a transaction, the interaction information could include the cost to the user, the time the interaction took place, and the name of a merchant associated with the interaction.

At step S528, the first user device 502 can generate a verification cryptogram using the interaction information and a diversified cryptographic key. For example, the verification cryptogram could be generated by encrypting the interaction information with the diversified cryptographic key.

At step S530, the first user device 502 can provide the verification cryptogram to the access device 508 in an interaction. Communications between the first user device 502 and the access device 508 can be better understood with reference to FIG. 7.

Figure 7:
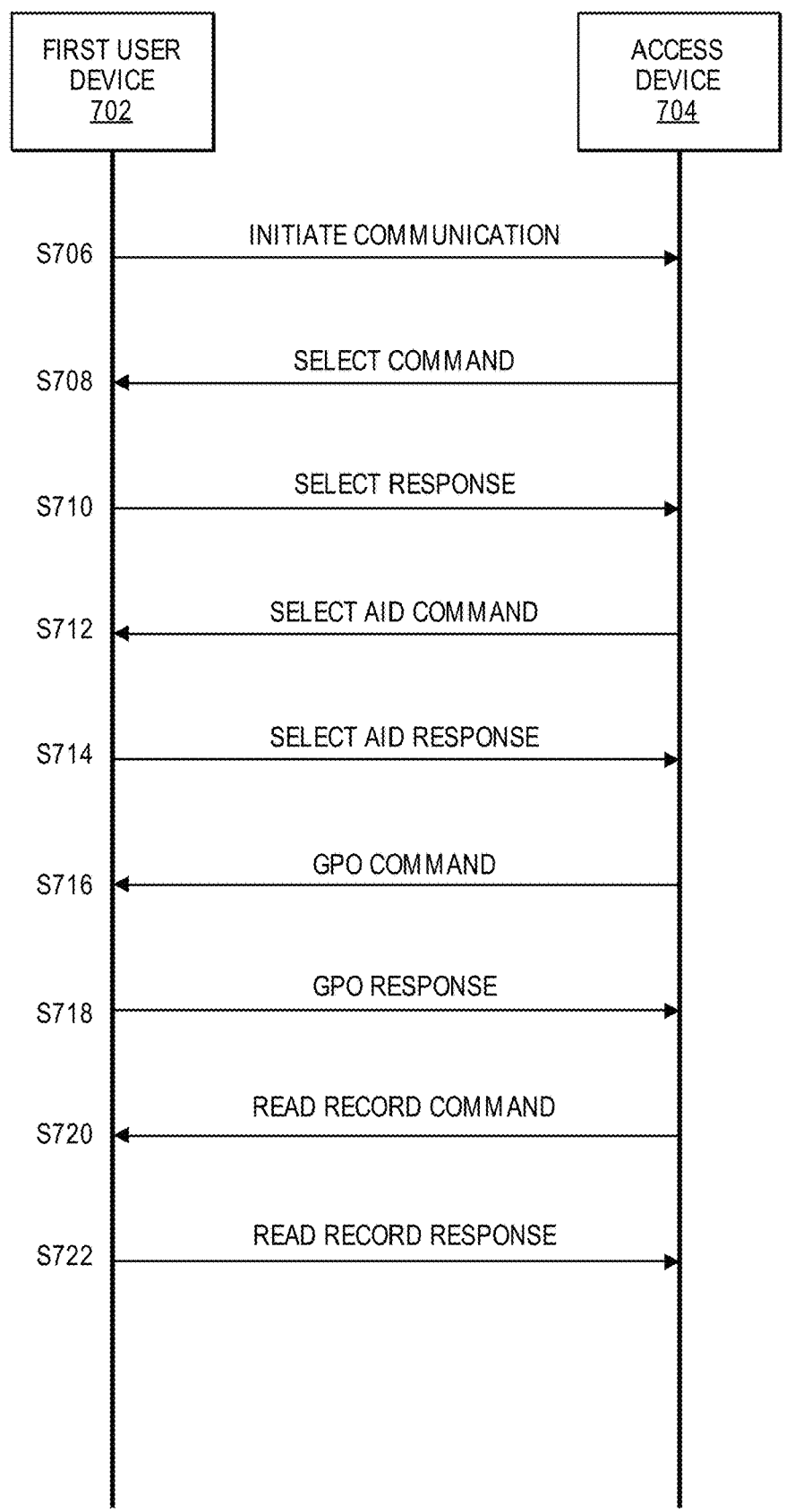
FIG. 7 shows a process flow diagram detailing communications between a second user device and an access device according to an embodiment of the invention.

FIG. 7 shows a flow diagram illustrating more detailed interactions between an access device 704 and a first user device 702 in a payment transaction. The various commands in FIG. 7 may correspond to commands or messages sent between the first user device 502 and access device 508 in steps S524-S530 from FIG. 5.

In step 706, the first user device 702 may initiate communication with the access device 704. In some embodiments, this may include the first user device 702 coming into physical contact or in close non-contact physical proximity. In other cases, the first user device 702 may initiate communication with the access device 704 via a network such as the Internet.

In step S708, when the access device 704 detects a presence of the first user device 702, a select command is sent from the access device 704 to the first user device 702. The select command may be a select PPSE command, which can be used to identify the payment environment supported by the access device 704.

In step S710, the first user device 702 may respond by sending an available applications response back to the access device 704. The available applications response may include a list of available AIDs and may include the payment environment identifier.

In step S712, the access device 704 may respond by sending an application selection command. The application selection command may include a selected suitable application from the list of applications received in the available applications response. In some embodiments, the application selection can be in the form of a select AID command.

In step S714, upon receiving the application selection, the application of the first user device 702 may send a terminal transaction data request to request transaction data from access device 704 which may be needed to execute the transaction. The transaction data requested by the application on the first user device 702 may include terminal transaction qualifiers (TTQ), an authorized amount, other amount, terminal country code, terminal verification results transaction currency code, transaction data, transaction type, and/or an unpredictable number such as a salt or cryptographic nonce.

In step S716, after receiving the terminal transaction data request, access device 704 may send, to the application of the first user device 702, the terminal transaction data requested by the application. In some embodiments, the terminal transaction data may include the requested terminal transaction data in a processing option data object list (PDOL).

In step S718, once the application of the first user device 702 receives terminal transaction data, the application may increment its Application Transaction Counter (ATC), generate dynamic transaction processing information using at least some of the received terminal transaction data, and send a set of transaction processing information including the generated dynamic transaction processing information to access device 704. In some embodiments, the transaction processing information may include a transaction or verification cryptogram dynamically generated using a diversified cryptographic key or D-UDK, track-2 equivalent data, and additional data such as issuer application data (IAD that can include an encrypted version of a primary access identifier), form factor indicator (FFI), card transaction qualifiers (CTQ), cryptogram information data (CID), the updated ATC, and/or an application PAN sequence number (PSN). In some embodiments, the issuer application data (IAD) may include a length indicator indicating the length of the IAD, cryptogram version number (CVN) indicating the version of the transaction or verification cryptogram, a derived key indicator (DKI) that can be used to identify a master key, such as a master derivation key (MDK) (e.g., a master key associated with the issuer used in generation of the D-UDK), card verification results (CVR), a wallet provider ID, and/or derivation data such as the key index that may have been used in the generation of the UDK or D-UDK.

In step S720, after the access device 704 receives the transaction processing information, the access device 704 may send an account data request to the application of first user device 702 to read additional account data that may be stored on the first user device 702. In some embodiments, the access data request may include an application file locator (AFL) indicating the address or location of the account data that access device 704 is attempting to read.

In S722, in response to receiving the account data request from access device 704, first user device 702 may send the account data stored at the location indicated by the AFL to access device 704. The account data may include, for example, application usage control that indicates the issuer's restriction on the usage and services allowed for the application, the access token, the cardholder's name, customer exclusive data, issuer country code, token requester ID (e.g., if a token is used), and/or other account related data that is accessible at the AFL location.

Once the access device 704 has received the requisite data from the transaction processing information and/or one or more account data transmissions, some or all of the data elements in the transaction processing information and/or one or more account data transmissions can be used by access device 704 to generate a transaction authorization request message to request authorization of the transaction from the issuer. For example, in some embodiments, the transaction authorization request message may include at least the track-2 equivalent data, the access token, and the verification cryptogram generated with the diversified cryptographic key, and the transaction can be authorized based on at least verifying that the transaction cryptogram was generated correctly and that the diversified cryptographic key used in the generation of the transaction or verification cryptogram is valid.

Returning to FIG. 5A, at step S532, the access device 508 can generate an authorization request message including the access token, the variable value, and the salt, and optionally the verification cryptogram.

At step S534, the access device 508 can transmit the authorization request message to a resource provider computer 510. In some cases, the resource provider computer 510 may be a merchant computer associated with a merchant and the access device 508 (e.g., a point of sale terminal). The resource provider computer 510 may optionally evaluate the authorization request message before forwarding it at step S536.

At step S536, the resource provider computer 510 can forward the authorization request message to a transport computer 512. In some cases, the transport computer 512 may be an acquirer computer associated with the resource provider computer 510. For example, the transport computer 512 may be a computer associated with an acquirer bank that manages an account on behalf of a resource provider associated with the resource provider computer 510.

At step S538, the transport computer 512 may optionally evaluate the authorization request message sent from the resource provider computer 510 and may route it to the remote server computer 514.

At step S540, the transport computer 512 can transmit the authorization request message to the remote server computer 514 for further processing.

At step S542, the remote server computer 514 can determine the primary access identifier and use the primary access identifier to determine if a user of the first user device 502 is authorized to conduct the interaction. This may involve decrypting the access token included in the authorization request message, determining the primary access identifier based on the access token, generating a second verification cryptogram, comparing the second verification cryptogram to the verification cryptogram optionally included in the authorization request message, and determining that the user of the first user device 502 is authorized to conduct the interaction if the verification cryptograms match.

The remote server computer 514 can optionally store the access token in a secure database in association with the primary access identifier, such that further interactions involving the access token do not require the same verification process described above.

Additionally, the remote server computer 514 may modify the authorization message to replace the access token with the primary access identifier, such that an authorization computer 516 can determine if the user of the first user device is authorized to conduct the interaction. Step S542 may be better understood with reference to FIG. 8.

Figure 8:
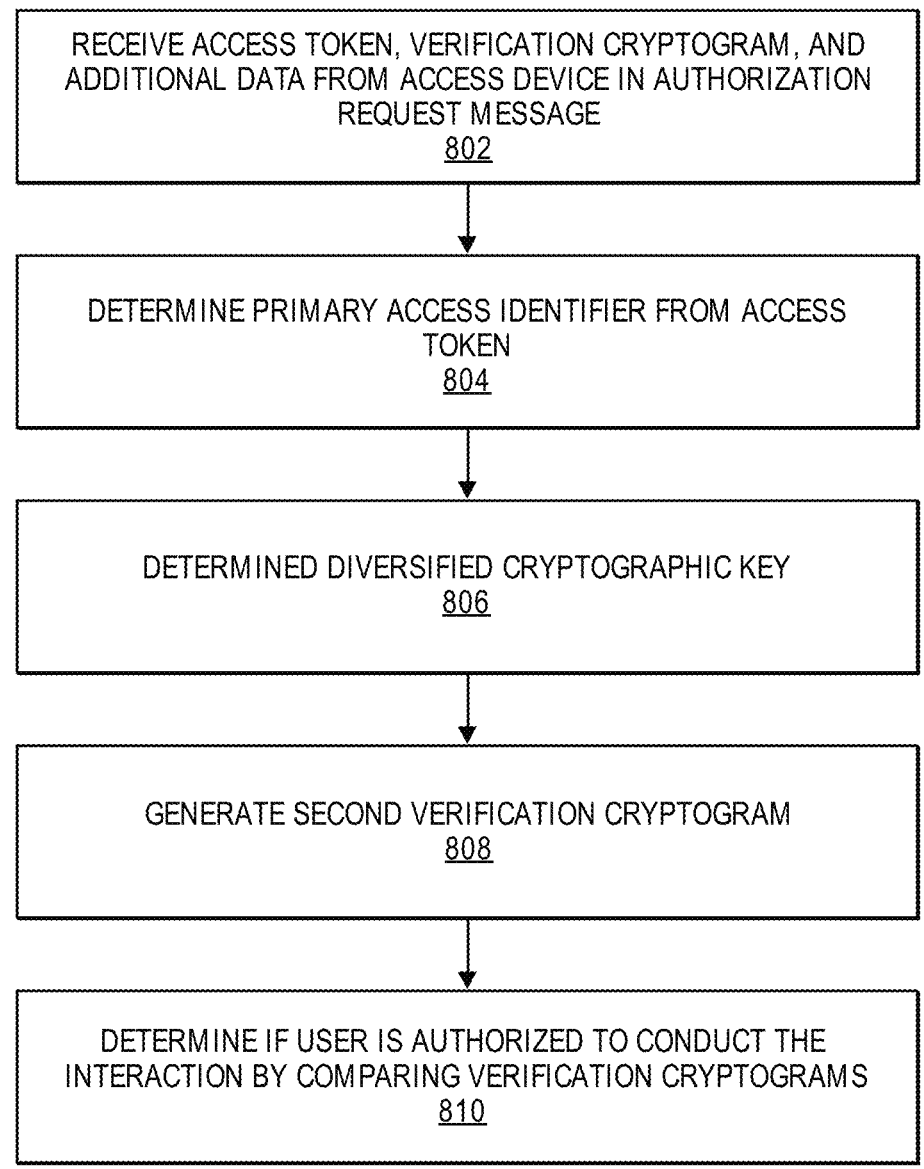
FIG. 8 shows a flowchart detailing a process performed by a remote server computer according to an embodiment of the invention.

FIG. 8 shows a method 800 performed by a remote server computer according to some embodiments of the invention. The various steps in FIG. 8 may correspond to steps S540-S542 from FIG. 5A.

At step 802, as part of an interaction, a remote server computer can receive an authorization request message including an access token, a variable value, a salt, and interaction information. This interaction information can include any information relating to an interaction that may take place between a first user device and an access device. For example, if an interaction includes a user attempting to purchase a good or service at a point of sale device (access device) using their cell phone (first user device), the interaction information may include transactional information, such as sale amount, time of day, applicable tax, etc. Additionally, the authorization request message may include a first verification cryptogram. These data may be communicated via any suitable means and received in any suitable format, such as an encrypted or secure messaging format. For example, the authorization request message could be received from a transport computer, such as the transport computer 512 in FIG. 5. As another example, the authorization request message could be received from an access device, such as the access device 508 in FIG. 5.

At step 804, the remote server computer can determine a primary access identifier based on the authorization request message. This may involve decrypting the access token using a cryptographic key and determining the primary access identifier from the decrypted access token. For example, if the access token was generated by combining the primary access identifier, variable value and salt and then encrypting the result, the remote server computer can separate the components in the access token and determine the primary access identifier based on their components. For example, a decrypted access token including "12345AG3220" could be separated into its components "12345," the primary access identifier, "AG," the user name, "322" the salt, and "0" the variable value. From those components, the remote server can determine the primary access identifier.

As another example, the decrypted access token could include the primary access identifier XOR the salt and the variable value. Having received the salt and variable in the authorization request message, the remote server computer can determine the primary access identifier by calculating the decrypted access token XOR the salt and variable value, producing the primary access identifier.

At step 806, the remote server computer can determine a diversified cryptographic key. This can be accomplished by encrypting the primary access identifier using a master derivation key to produce a UDK, then combining the UDK, variable value, and salt, and encrypting the result to produce the diversified cryptographic key.

At step 808, the remote server computer can generate a second verification cryptogram based on the diversified cryptographic key, the access token, and interaction information. In some embodiments, this can involve combining the access token and interaction information based on a known protocol (such as concatenating or appending the interaction information to the end of the access token, or calculating the access token XOR the interaction information), and encrypting the result with the diversified cryptographic key.

At step 810, the remote server computer may compare the first verification cryptogram received in the authorization request message against the second verification cryptogram, and may authorize the user to conduct the interaction if the second verification cryptogram matches the first verification cryptogram. This may be accomplished by comparing each digit, bit, or other memory unit of the first and second verification cryptogram and determining if they are an exact or approximate match.

Returning to FIG. 5A, at step S544, the remote server computer 514 may transmit the modified authorization request message to an authorization computer 516. In some cases, the authorization computer 516 may be an issuer computer associated with an issuing entity. The issuing entity may have issued the second user device 504 or any data stored thereon to the user associated with the first, second, and third user devices 502-506. The issuing entity may be an issuing bank that manages an account on behalf of the user.

At step S546, after receiving the modified authorization request message, the authorization computer 516 may determine whether or not the user associated with the first user device 502 is authorized to conduct the interaction. For example, in a transactional interaction, the authorization computer may check to see if the account balance or available credit limit of the account associated with the primary access identifier is greater than a transaction amount in the authorization request message. It may also perform fraud checks and other transaction analysis.

At step S548, the authorization computer 516 may generate and transmit an authorization response message to the remote server computer 514.

At step S550, after receiving the authorization response message from the authorization computer 516, the remote server computer 514 may transmit the authorization response message to the transport computer 512. In some embodiments the primary access identifier may be replaced with the access token by the remote server computer before it is forwarded on to the transport computer 512.

At step S552, the transport computer 512 may determine which resource provider computer 510 is associated with the authorization response message.

At step S554, the transport computer may transmit the authorization response message to the resource provider computer 510.

The resource provider computer 510 may initiate transfer of, or allow access to the resource to the user associated with the first user device 502. For example, if the resource provider is an online merchant, and the resource is a good such as a wireless speaker, the merchant may begin the process of shipping the good to the user. As another example, if the resource is access to a building or an apartment complex, the resource provider computer 510 may remotely open the door of that building or apartment complex so that the user can enter.

In the case of transactional interactions, at the end of the day or at some other suitable time interval, a clearing and settlement process between the resource provider computer 1008, the transport computer 1010, the remote server computer 1012, and the authorization computer 1014 may be performed on the transaction.

Referring now to FIG. 5B, at step S556, the second user device 504 can generate a subsequent access token using the primary access identifier, a subsequent variable value and a subsequent salt. In some embodiments, the subsequent variable value may be a counter value or diversified counter value. As an example, if the variable value used to generate the access token was "0," the subsequent variable value may be "1." In some embodiments, the subsequent salt may be another random value randomly generated by the second user device 504.

The second user device 504 may generate the subsequent access token in substantially the same way as the second user device 504 generated the access token in step S518. It may involve concatenating or otherwise combining the primary access identifier, subsequent variable value, and subsequent salt, then encrypting the result with a cryptographic key.

At step S558, the third user device 506 can receive the subsequent access token from the second user device 504. Additionally, the third user device 506 may receive an encrypted version of the primary access identifier, a diversified cryptographic key, the subsequent variable value, and subsequent salt. These data may be received via any suitable communication method and/or protocol. For example, the third user device 506 and the second user device 504 may establish a secure near field communication channel and the third user device 506 may receive the primary access identifier, diversified cryptographic key, subsequent variable value and subsequent salt in an encrypted form over the secure communication channel.

At step S560, the third user device 506 can store the subsequent access token, subsequent variable value, and subsequent salt. The third user device 506 may store these data on a secure element, such as a trusted execution environment, secure execution environment, or universal integrated circuit card, among others.

The method 500 may be better understood with reference to an example use case. In this example, a user wants to access a building (an interaction), such as their apartment complex. Access to the building may be controlled by a locked door and an access terminal. The user may have key fob, smart card or other access device (second user device) that can be used to provision access tokens to other devices owned by the user, such as smartphone (first user device) or smart watch (third user device). Any user device can pass their access token and a verification cryptogram to the access terminal. The access terminal can generate an authorization request message and transmit it to a remote server computer. The remote server computer can determine a primary access identifier associated with the access token, and determine if the user is authorized to access the building based on that primary access identifier. This example is explored in more detail with reference to FIG. 9.

Figure 9:
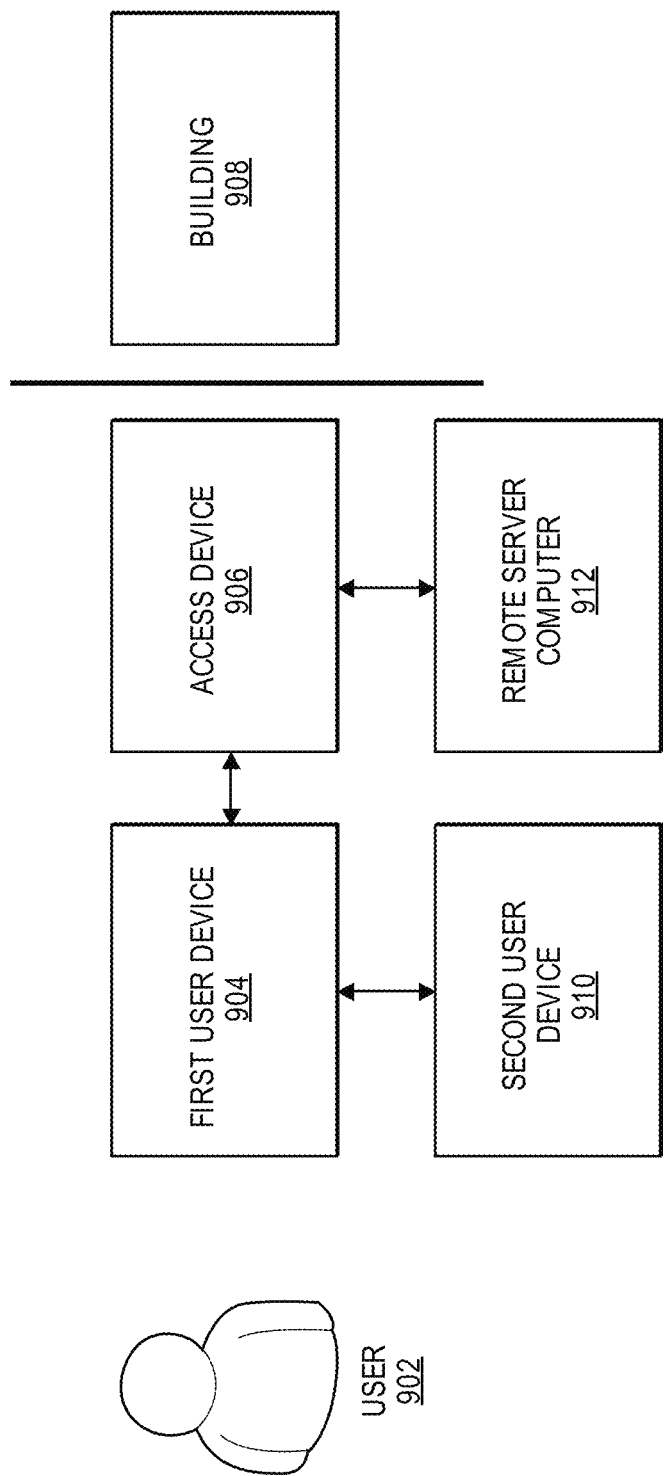
FIG. 9 shows a system block diagram including an access device and a building according to an embodiment of the invention.

FIG. 9 shows a block diagram of a building access system, including a user 902, a first user device 904, an access device 906, a building 908, a second user device 910, and a remote server computer 912. As an example, the user 902 could be a tenant of an apartment complex (the building 908). The first user device 904 could be a smart phone or smart watch owned by the user. The second user device 910 could be a key fob or smart card provided to the user by the landlord for the purpose of accessing the building 908. The access device 906 could be an electronic terminal, near a locked entrance where the user 902 can interface a user device as part of gaining access to the building 908. The remote server computer 912 could be a computer, either inside the building or elsewhere that determines whether users are authorized to access the building (e.g., if the users are tenants or guests).

The user 902 can interface the first user device 904 and the second user device 910. This could be accomplished using contactless or near field communication. The second user device 910 can provide an access token, variable value and salt to the first user device 904. At this point, the user 902 can use the first user device 904 to access the building 908. The user 902 can interface the first user device 904 with the access device 906. The first user device 904 can provide the access token, variable value, salt, and a verification cryptogram to the access device 906. The access device 906 can generate an authorization request message including the access token, variable value, salt, and verification cryptogram to the remote server computer 912. The remote server computer 912 can decrypt the access cryptogram using a cryptographic key in order to determine a primary access identifier. The remote server computer can determine based on this primary access identifier whether the user 902 is authorized to access the building 908. The remote server computer can transmit an authorization response to the access device 906. If the authorization response indicates that the user 902 is authorized to access the building 908, the access device 906 could unlock the door for long enough for the user 902 to go through it. Using methods according to embodiments, a user 902 can easily and conveniently provision a unique access token to each of their user devices, then use any of their user devices to gain access to a building 908. Rather than carrying around a set of keys or a smart card and using those keys or smart card to access their apartment complex, a user could simply provision an access token to their smart watch, reducing the number of things they have to carry and worry about.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be configured as computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method comprising:
   generating, by a second user device, a plurality of access tokens for a plurality of user devices using a primary access identifier, a plurality of variable values, and a plurality of salts, respectively, wherein the generating comprises:
   generating, for a first user device among the plurality of user devices, a first access token using the primary access identifier among the plurality of access tokens, a first salt among the plurality of salts, and a first variable value among the plurality of variable values, the first variable value comprising a first counter value that is an incremented value and identifies the first user device in an interaction, wherein, in the generating the first access token, the first counter value is set to an initial value; and
   transmitting, by the second user device to the first user device, the first access token, the first salt, and the first variable value,
   wherein the second user device is configured to generate a second access token, among the plurality of access tokens, for a third user device among the plurality of user devices, using the primary access identifier, a second salt among the plurality of salts, and a second variable value among the plurality of variable values, the second variable value comprising a second counter value that identifies the third user device in an interaction, wherein, in the generating the second access token, the second counter value is the initial value increased by 1, wherein the second access token is generated as a next access token after generating the first access token,
   wherein the first user device provides to an access device in the interaction, the first access token, the first variable value, and the first salt, and
   wherein the access device generates an authorization request message comprising the first access token, the first variable value, and the first salt, and transmits the authorization request message to a remote server computer that determines the primary access identifier based on the authorization request message and uses the primary access identifier to determine if a user of the first user device is authorized to conduct the interaction.

2. The method of claim 1, further comprising:
   transmitting, by the second user device to the first user device, an encrypted version of the primary access identifier, wherein the first user device provides, to the access device in the interaction, the encrypted version of the primary access identifier,
   wherein the access device generates the authorization request message so that the authorization request message further comprises the encrypted version of the primary access identifier, and
   wherein the remote server computer decrypts the encrypted version of the primary access identifier to determine the primary access identifier.

3. The method of claim 1, wherein the first user device is a wearable device or a first mobile phone and the second user device is a card or a second mobile phone.

4. The method of claim 1, further comprising:
   transmitting, by the second user device to the third user device, the second access token,
   wherein the third user device stores the second access token, the second variable value, and the second salt.

5. The method of claim 1, wherein the generating further comprises generating the first access token by encrypting the primary access identifier, the first variable value, and the first salt using a cryptographic key, and
   wherein the remote server computer determines the primary access identifier by decrypting the first access token.

6. The method of claim 1, further comprising:
   generating, by the second user device, a diversified cryptographic key using a Unique Diversified Key (UDK), the first variable value, and the first salt; and
   transmitting, by the second user device to the first user device, the diversified cryptographic key,
   wherein the first user device generates a verification cryptogram using the diversified cryptographic key, and provides the verification cryptogram to the access device in the interaction,
   wherein the access device generates the authorization request message so that the authorization request message further comprises the verification cryptogram, and
   wherein the remote server computer uses the verification cryptogram to determine if the user of the first user device is authorized to conduct the interaction.

7. The method of claim 1, wherein the generating the first access token further comprises generating the first access token by further using a verification value, an expiration date, and a user identifier.

8. A second user device comprising:
   a processor; and
   a non-transitory computer readable medium coupled to the processer, the non-transitory computer readable medium comprising code executable by the processor for performing a method including:
   generating a plurality of access tokens for a plurality of user devices using a primary access identifier, a plurality of variable values, and a plurality of salts, respectively, wherein the generating includes:
   generating, for a first user device among the plurality of user devices, a first access token using the primary access identifier among the plurality of access tokens, a first salt among the plurality of salts, and a first variable value among the plurality of variable values, the first variable value comprising a first counter value that is an incremented value and identifies the first user device in an interaction, wherein, in the generating the first access token, the first counter value is set to an initial value; and
   transmitting, to the first user device, the first access token, the first salt, and the first variable value, wherein the first user device provides to an access device in the interaction, the first access token, the first variable value, and the first salt, wherein the access device generates an authorization request message comprising the first access token, the first variable value, and the first salt, and transmits the authorization request message to a remote server computer that determines the primary access identifier based on the authorization request message and uses the primary access identifier to determine if a user of the first user device is authorized to conduct the interaction, and wherein, by executing the code, the processor is configured to generate a second access token, among the plurality of access tokens, for a third user device among the plurality of user devices, using the primary access identifier, a second salt among the plurality of salts, and a second variable value among the plurality of variable values, the second variable value comprising a second counter value that identifies the third user device in an interaction, wherein, in the generating the second access token, the second counter value is the initial value increased by 1, wherein the second access token is generated as a next access token after generating the first access token.

9. The second user device of claim 8, wherein the method further includes:

transmitting, to the first user device, an encrypted version of the primary access identifier, wherein the first user device provides the encrypted version of the primary access identifier to the access device in the interaction wherein the access device generates the authorization request message so that the authorization request message further comprises the encrypted version of the primary access identifier, and wherein the remote server computer decrypts the encrypted version of the primary access identifier to determine the primary access identifier.

10. The second user device of claim 8, wherein the first user device is a wearable device and the second user device is a mobile phone.

11. The second user device of claim 8, wherein the generating further includes generating the first access token by encrypting the primary access identifier, the first variable value, and the first salt using a cryptographic key, and wherein the remote server computer determines the primary access identifier by decrypting the first access token.

12. The second user device of claim 8, wherein the method further includes:

generating a diversified cryptographic key using a Unique Diversified Key (UDK), the first variable value, and the first salt; and transmitting, to the first user device, the diversified cryptographic key, wherein the first user device generates a verification cryptogram using the diversified cryptographic key, and provides the verification cryptogram to the access device in the interaction, wherein the access device generates the authorization request message so that the authorization request message further comprises the verification cryptogram, and wherein the remote server computer uses the verification cryptogram to determine if the user of the first user device is authorized to conduct the interaction.

13. The second user device of claim 8, wherein generating the first access token further includes generating the first access token by further using a verification value, an expiration date, and a user identifier.

14. The second user device of claim 8, wherein the transmitting further includes transmitting the first access token, the first variable value, and first the salt via at least one from among Bluetooth, Wi-Fi, and near field communication.

15. A method comprising:

receiving, by a remote server computer as a part of an interaction, an authorization request message comprising interaction information, a first access token, a first variable value, and a first salt that correspond to a first user device, wherein the first variable value comprises a first counter value that is an incremented value and identifies the first user device in the interaction, wherein the first counter value is set to an initial value for first access token;

determining, by the remote server computer, a primary access identifier based on the authorization request message; and determining, by the remote server computer, if a user of the first user device is authorized to conduct the interaction based on the primary access identifier, wherein the first access token is generated by a second user device using the primary access identifier, the first variable value, and the first salt and is transmitted to the first user device, wherein the second user device is configured to generate a plurality of access tokens for a plurality of user devices using the primary access identifier, a plurality of variable values, and a plurality of salts, respectively, the plurality of access tokens including a second access token generated for a third user device using the primary access identifier, a second variable value, and a second salt, the second variable value comprising a second counter value that identifies the third user device in an interaction, wherein the second counter value is the initial value increased by 1, wherein the second access token is generated as a next access token after the first access token is generated, wherein the first user device and the third user device are included in the plurality of user devices, the first access token and the second access token are included in the plurality of access tokens, the first variable value and the second variable value are included in the plurality of variable values, and the first salt and the second salt are included in the plurality of salts.

16. The method of claim 15, further comprising:

receiving, by the remote server computer, a first verification cryptogram generated by the first user device by encrypting the interaction information with a diversified cryptographic key;

generating, by the remote server computer, based on the primary access identifier, the first variable value, and the first salt the diversified cryptographic key;

generating, by the remote server computer, a second verification cryptogram based on the diversified cryptographic key, the first access token, and the interaction information; and comparing, by the remote server computer, the first verification cryptogram to the second verification cryptogram, wherein the user of the first user device is authorized to conduct the interaction if the second verification cryptogram matches the first verification cryptogram.

17. The method of claim 15, wherein the determining the primary access identifier based on the authorization request message further comprises decrypting the first access token to determine the primary access identifier.

18. The method of claim 15, wherein the first access token is encrypted by the second user device using a first cryptographic key of a cryptographic key pair, and wherein the first access token is decrypted using a second cryptographic key of the cryptographic key pair.

19. The method of claim 15, further comprising:

storing, by the remote server computer, the first access token in a secure database in association with the primary access identifier.

* * * * *